US009857906B2

(12) United States Patent
Park et al.

(10) Patent No.: US 9,857,906 B2
(45) Date of Patent: Jan. 2, 2018

(54) TOUCH WINDOW

(71) Applicant: LG INNOTEK CO., LTD., Seoul (KR)

(72) Inventors: Duck Hoon Park, Seoul (KR); Ki Young Kwon, Seoul (KR); Soo Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 52 days.

(21) Appl. No.: 14/601,833

(22) Filed: Jan. 21, 2015

(65) Prior Publication Data

US 2015/0205424 A1    Jul. 23, 2015

(30) Foreign Application Priority Data

Jan. 22, 2014  (KR) .................. 10-2014-0007634
Jan. 23, 2014  (KR) .................. 10-2014-0008167
Jan. 23, 2014  (KR) .................. 10-2014-0008168

(51) Int. Cl.
 *G06F 3/041* (2006.01)
 *G06F 3/044* (2006.01)
 *G06F 3/047* (2006.01)

(52) U.S. Cl.
 CPC ............ *G06F 3/0414* (2013.01); *G06F 3/044* (2013.01); *G06F 3/047* (2013.01); *G06F 3/0412* (2013.01); *G06F 2203/04102* (2013.01); *G06F 2203/04112* (2013.01)

(58) Field of Classification Search
 CPC ...... G06F 3/0414; G06F 3/0412; G06F 3/044; G06F 3/047; G06F 3/017; G06F 3/03547; G06F 2203/04102; G06F 2203/04101; G06F 2203/04104; G06F 2203/04112; G06F 2203/04113

USPC ......................................................... 345/174
See application file for complete search history.

(56) References Cited

U.S. PATENT DOCUMENTS

| 2002/0031605 | A1* | 3/2002 | Chang ............... G02F 1/133553 427/261 |
| 2006/0177965 | A1* | 8/2006 | Senda .................. H01L 21/563 438/108 |
| 2010/0045906 | A1* | 2/2010 | Tokuda ............... G02F 1/13394 349/110 |
| 2011/0261009 | A1* | 10/2011 | Inagaki ................. G06F 3/0418 345/174 |
| 2012/0262385 | A1* | 10/2012 | Kim ........................ G06F 3/044 345/173 |
| 2012/0327021 | A1* | 12/2012 | Ryu ........................ G06F 3/044 345/174 |

(Continued)

FOREIGN PATENT DOCUMENTS

| KR | 10-2012-0040032 A | 4/2012 |
| KR | 10-2012-0126419 A | 11/2012 |

(Continued)

*Primary Examiner* — Amare Mengistu
*Assistant Examiner* — Gloryvid Figueroa-Gibson
(74) *Attorney, Agent, or Firm* — KED & Associates, LLP

(57) ABSTRACT

A touch window includes a substrate including an active region and an unactive region, a resin layer provided on the substrate. The resin layer includes an intaglio part and an embossment part adjacent to the intaglio part, and an electrode layer in the intaglio part. The embossment part includes a curved surface.

20 Claims, 23 Drawing Sheets

(56) References Cited

U.S. PATENT DOCUMENTS

| | | | |
|---|---|---|---|
| 2013/0307565 A1* | 11/2013 | Ra | G06F 3/044 |
| | | | 324/649 |
| 2014/0131075 A1* | 5/2014 | Jang | G06F 3/041 |
| | | | 174/255 |
| 2014/0218636 A1* | 8/2014 | Gao | G06F 3/044 |
| | | | 349/12 |
| 2014/0251661 A1* | 9/2014 | Cok | G02B 6/138 |
| | | | 174/253 |
| 2014/0284079 A1* | 9/2014 | Zhou | H05K 1/0296 |
| | | | 174/250 |
| 2015/0075846 A1* | 3/2015 | Yoshiki | G06F 3/045 |
| | | | 174/253 |

FOREIGN PATENT DOCUMENTS

| | | |
|---|---|---|
| KR | 10-2013-0067529 A | 6/2013 |
| KR | 10-2013-0105558 A | 9/2013 |
| KR | 10-2013-0105559 A | 9/2013 |
| KR | 10-2013-0108220 A | 10/2013 |

* cited by examiner

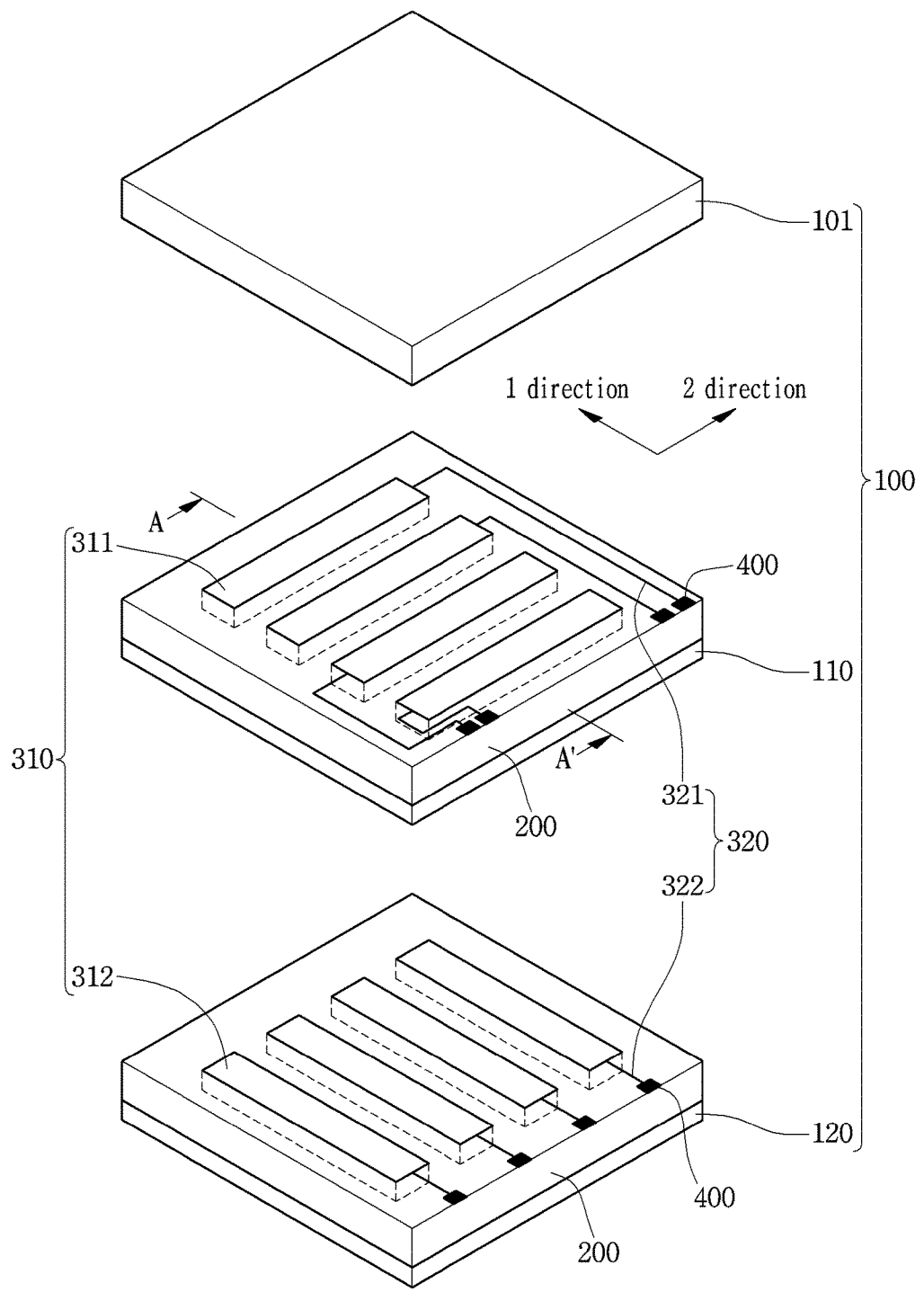
[FIG. 1]

【FIG. 2】
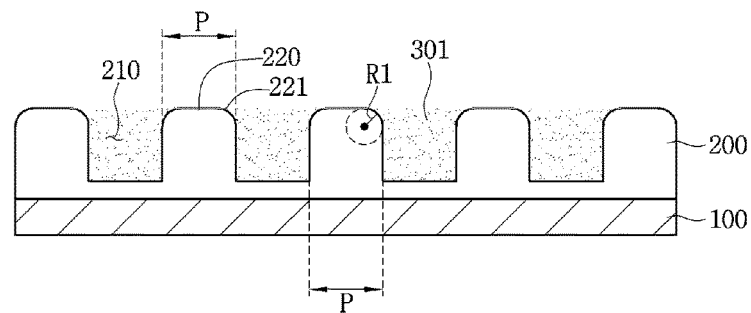
【FIG. 3】
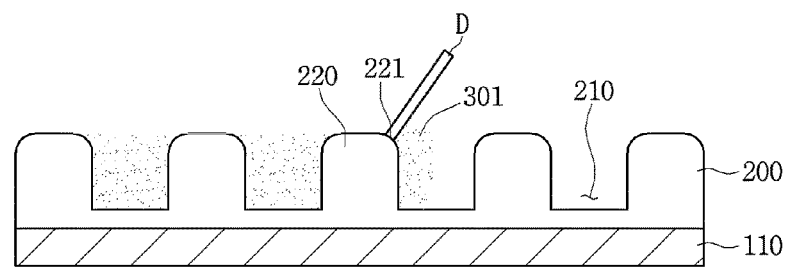
【FIG. 4】
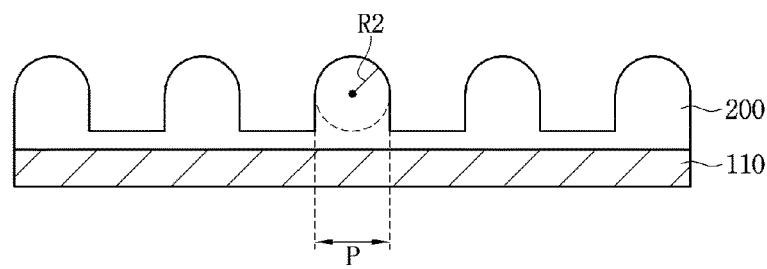
【FIG. 5】
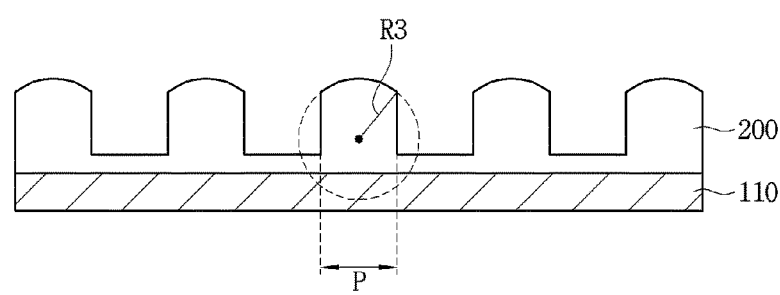

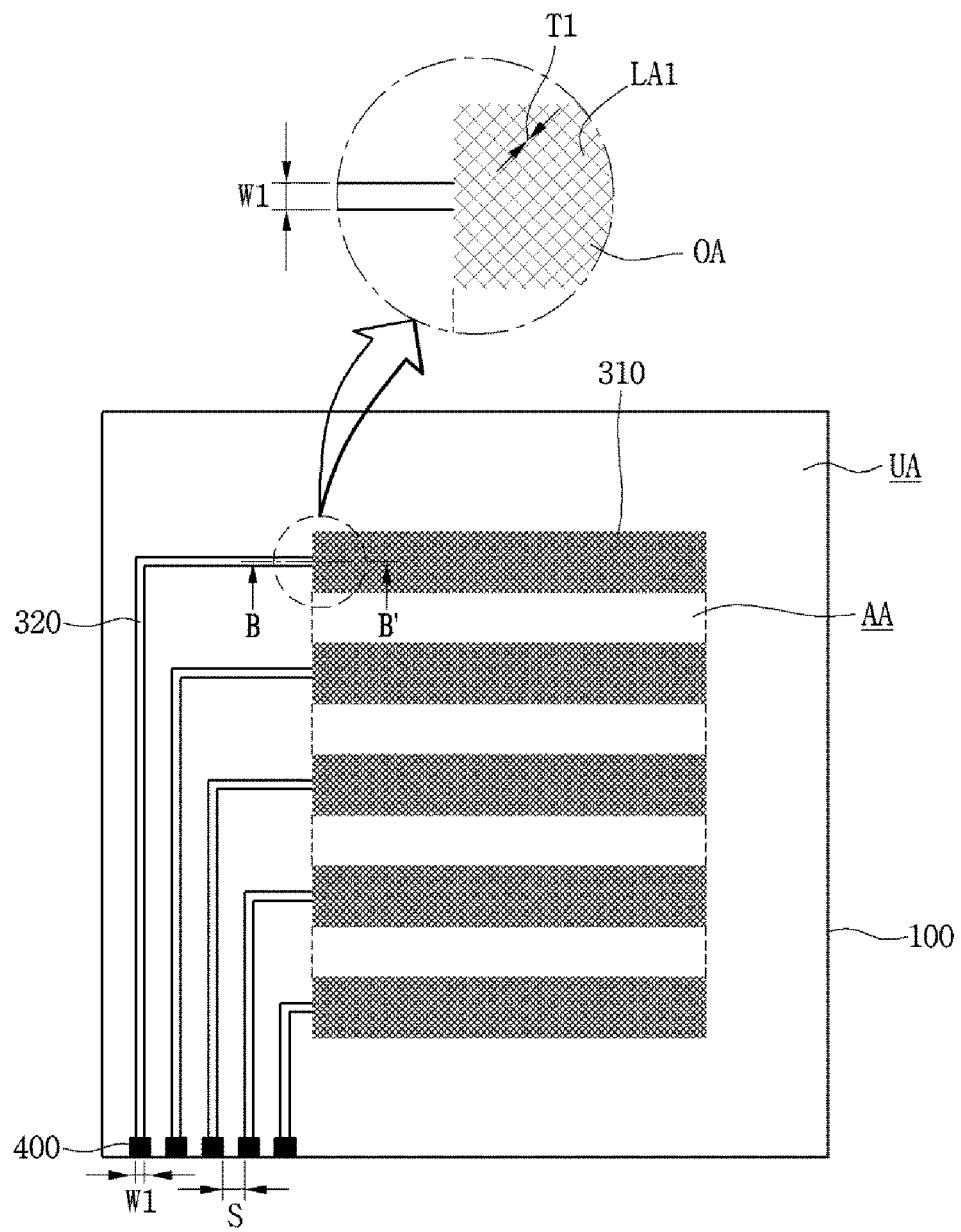

[FIG. 7]
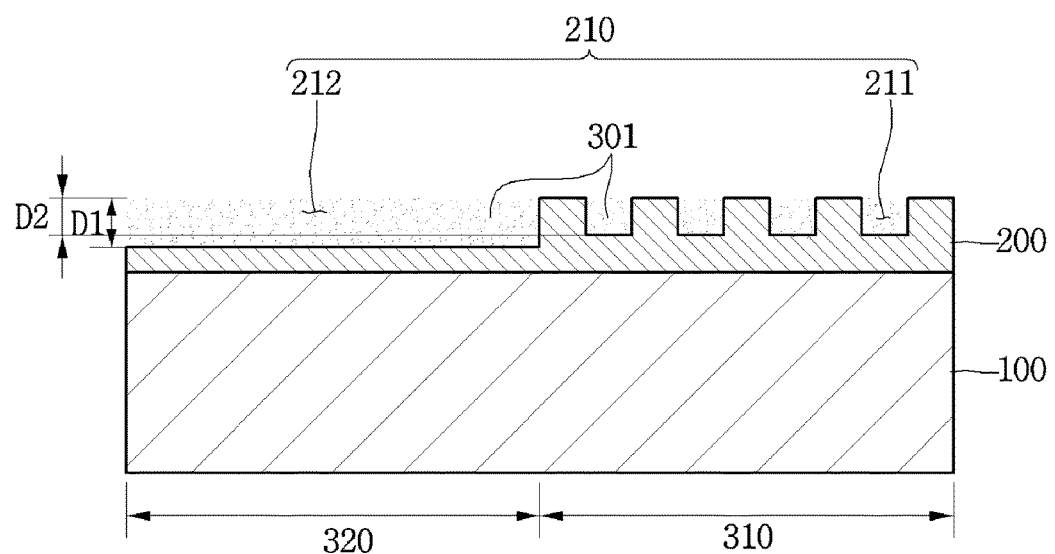

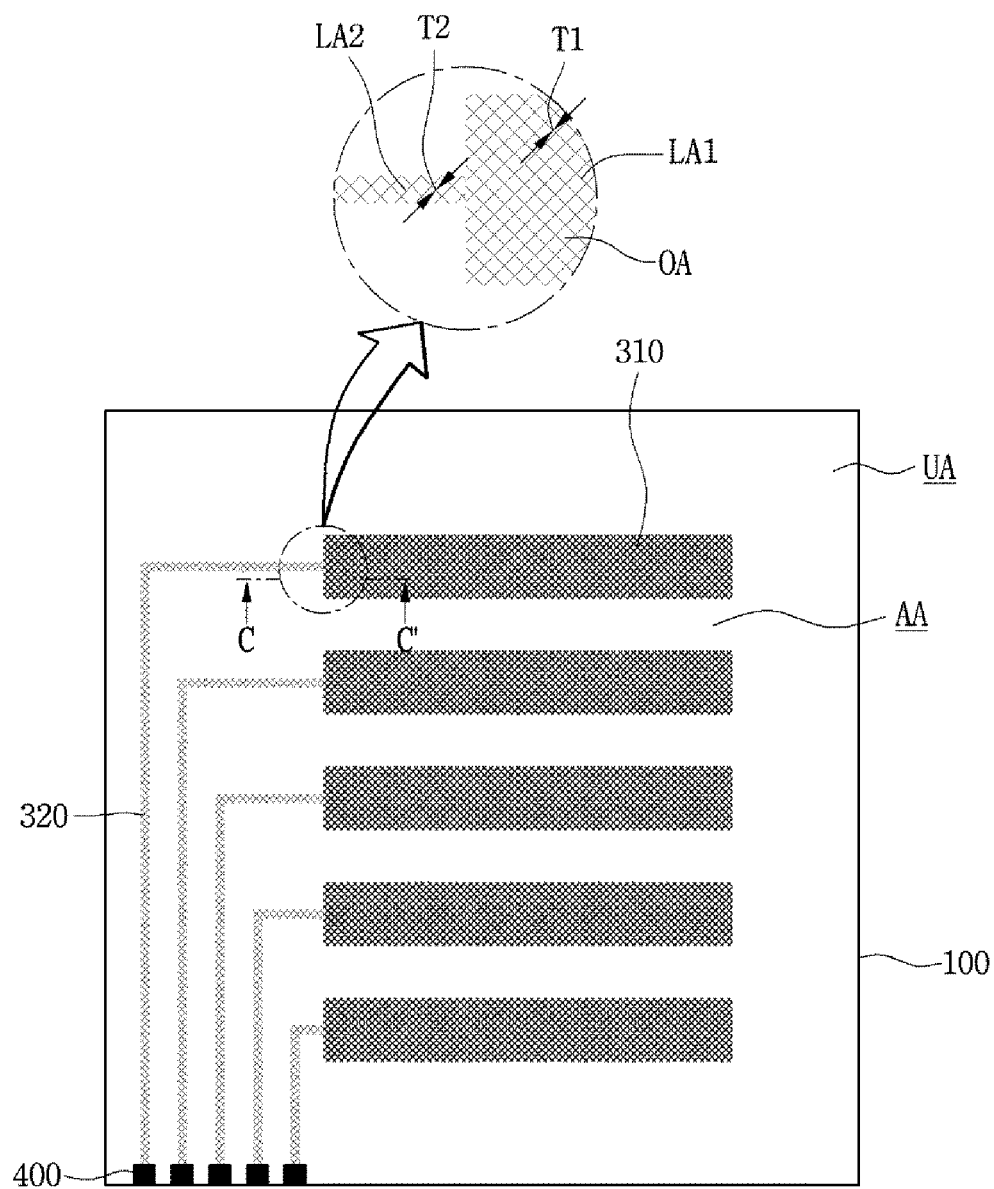

【FIG. 9】
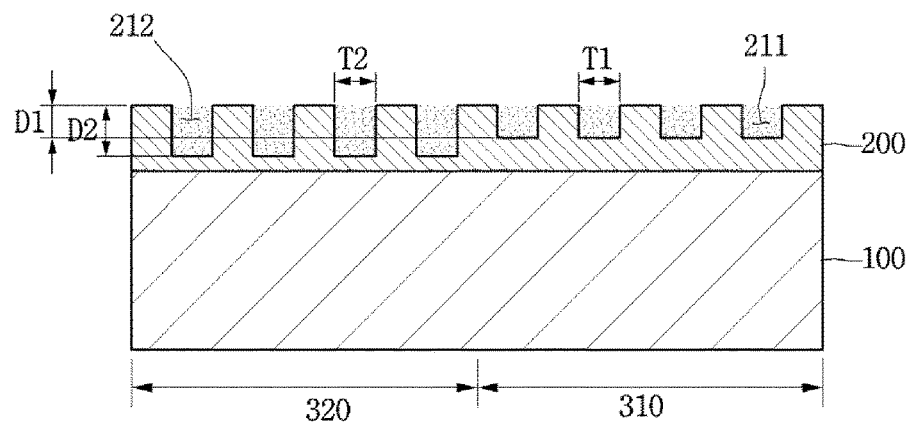
【FIG. 10】
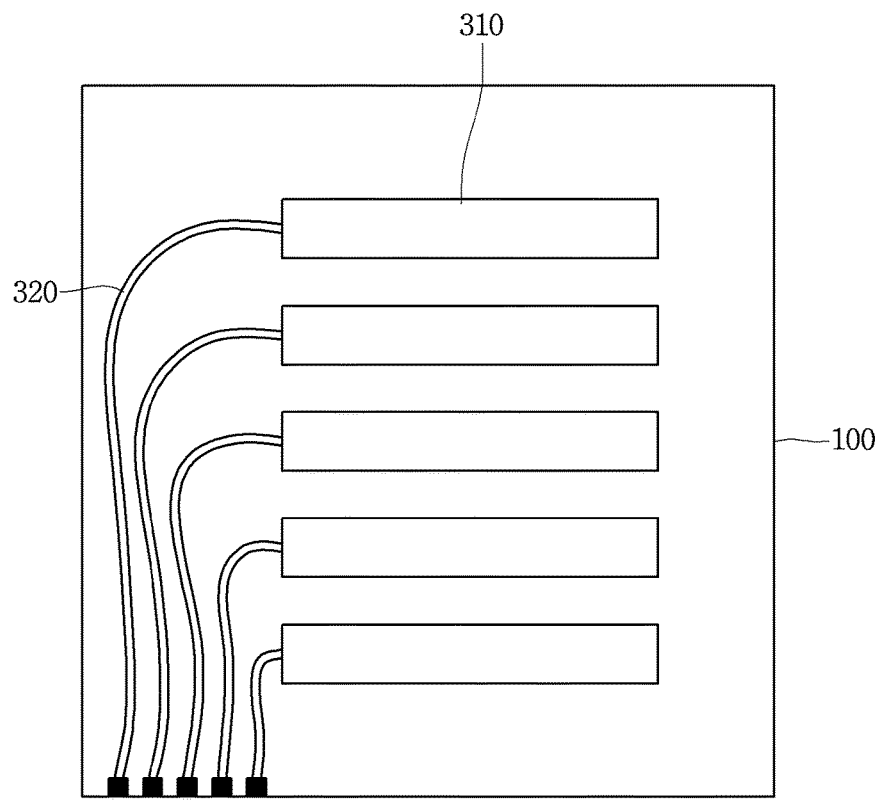

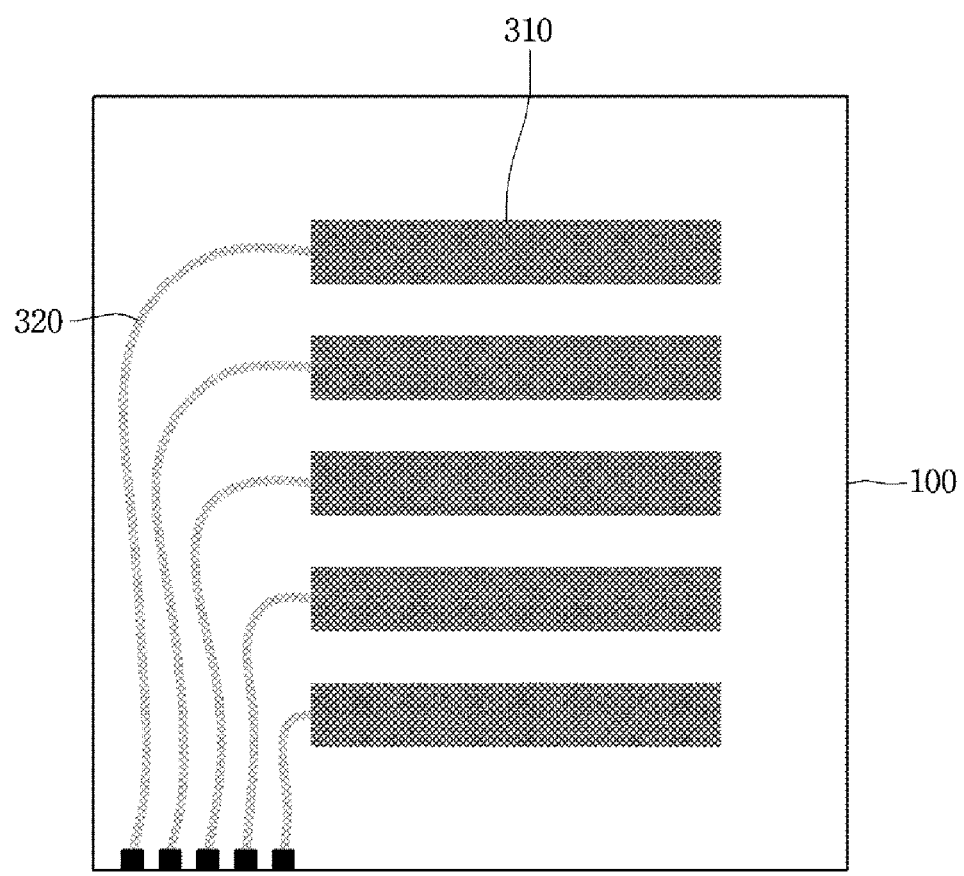
[FIG. 11]

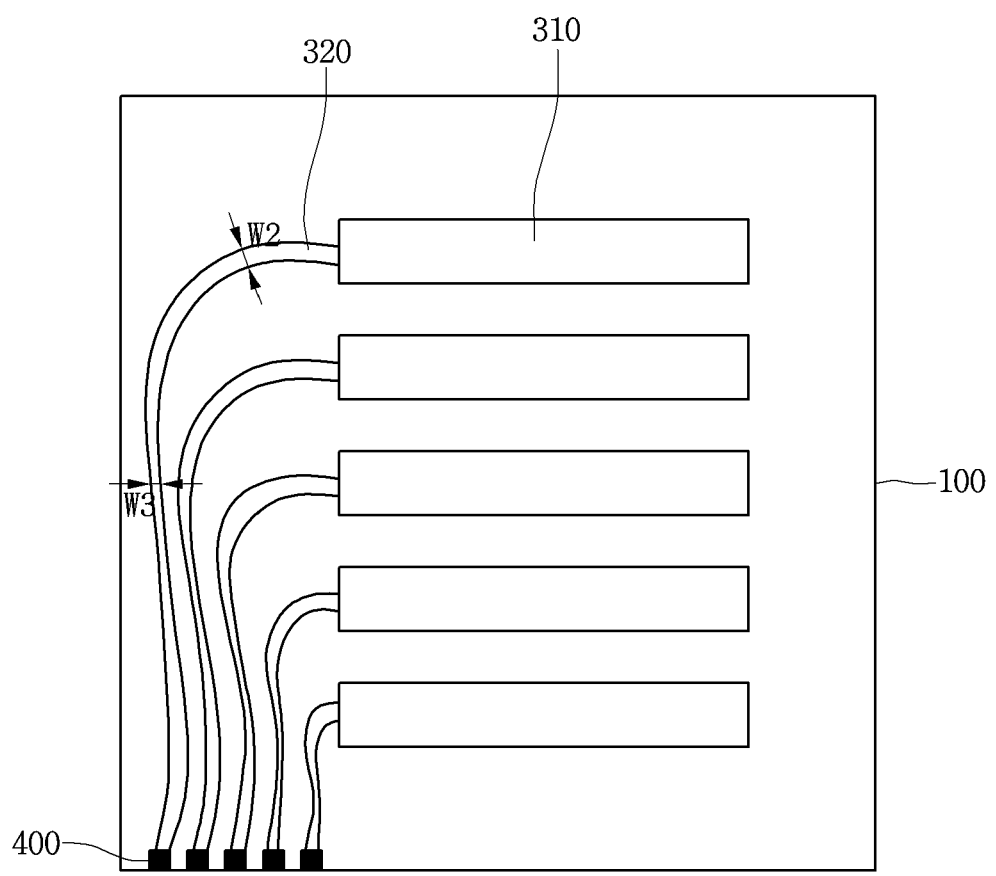
【FIG. 12】

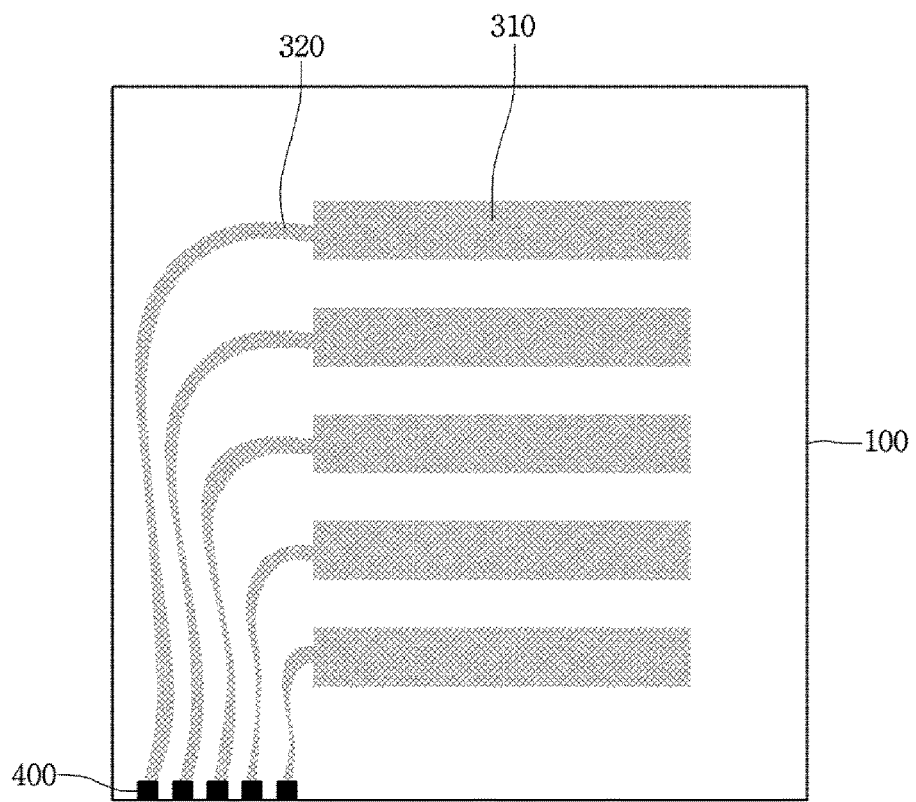
【FIG. 13】

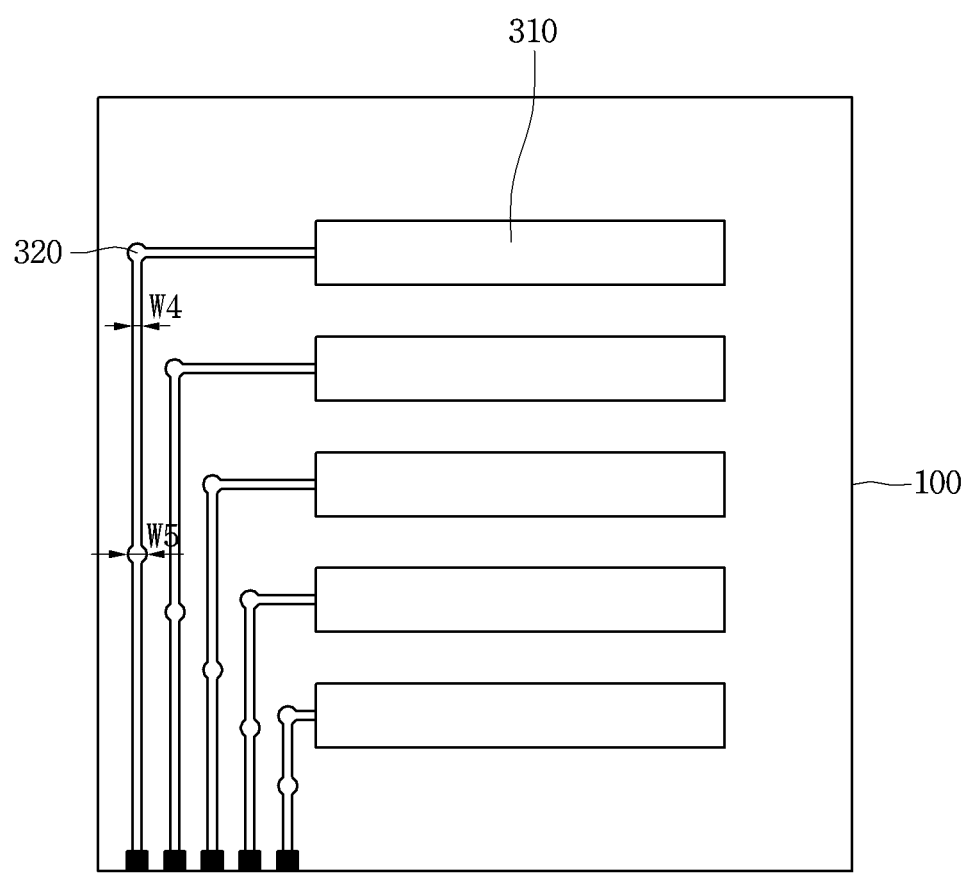
[FIG. 14]

[FIG. 15]
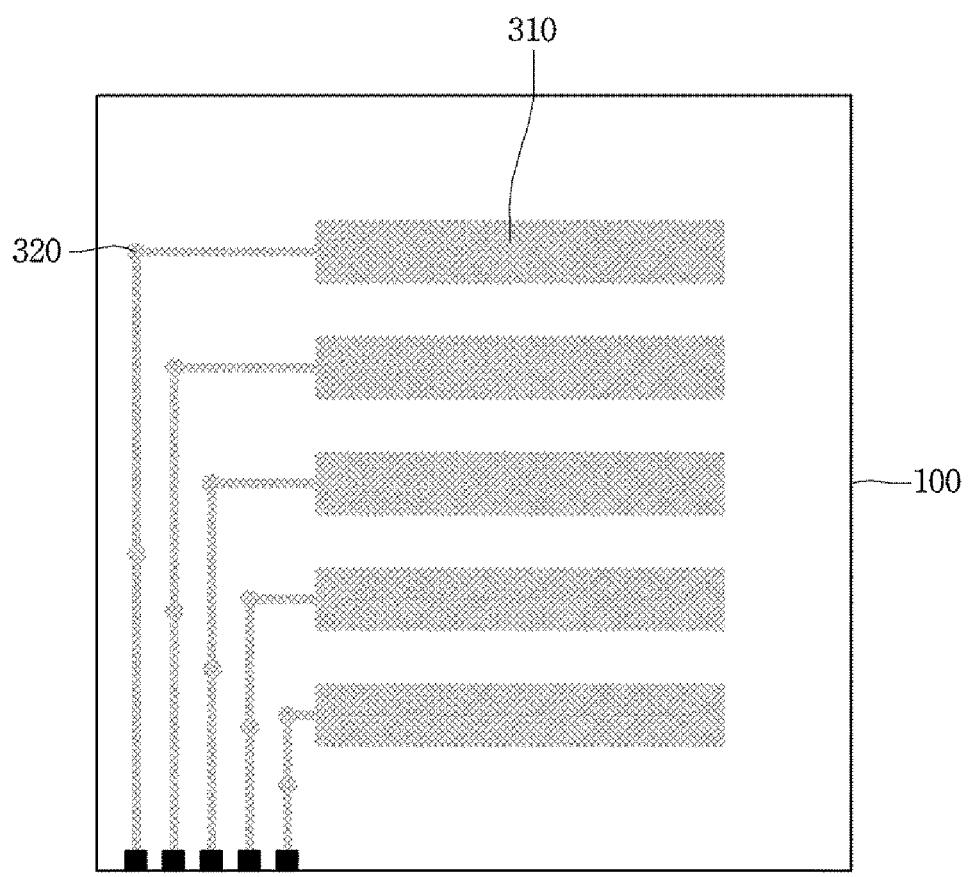

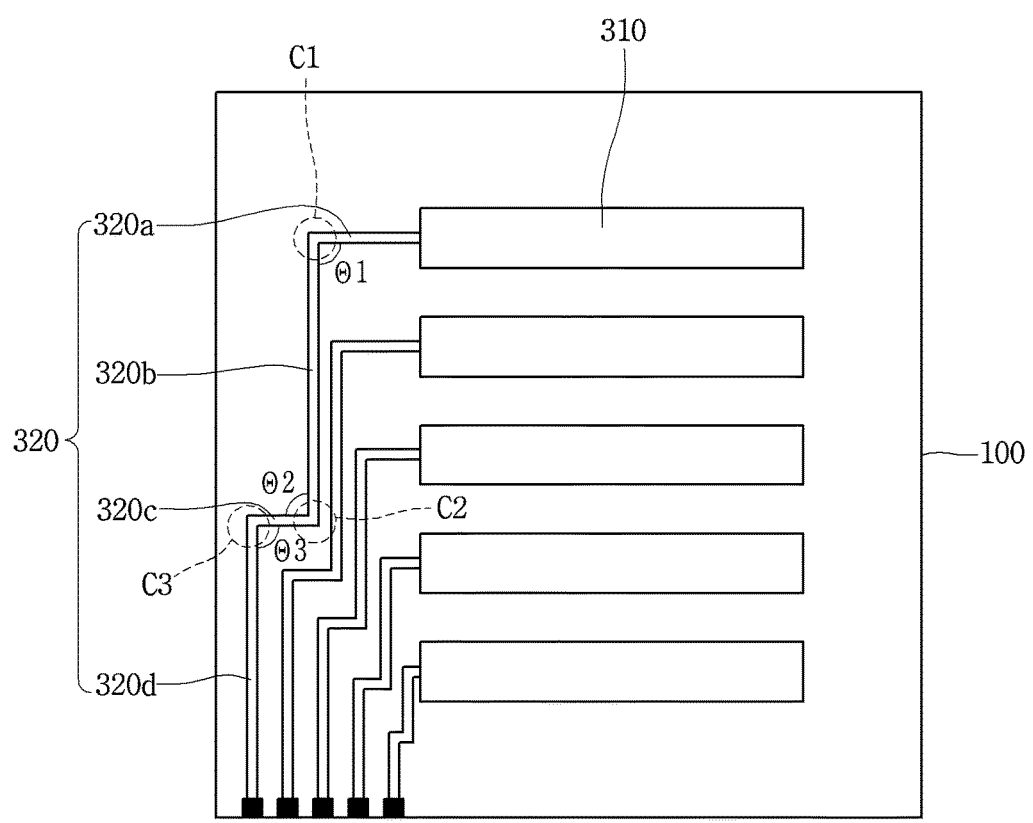
[FIG. 16]

[FIG. 17]
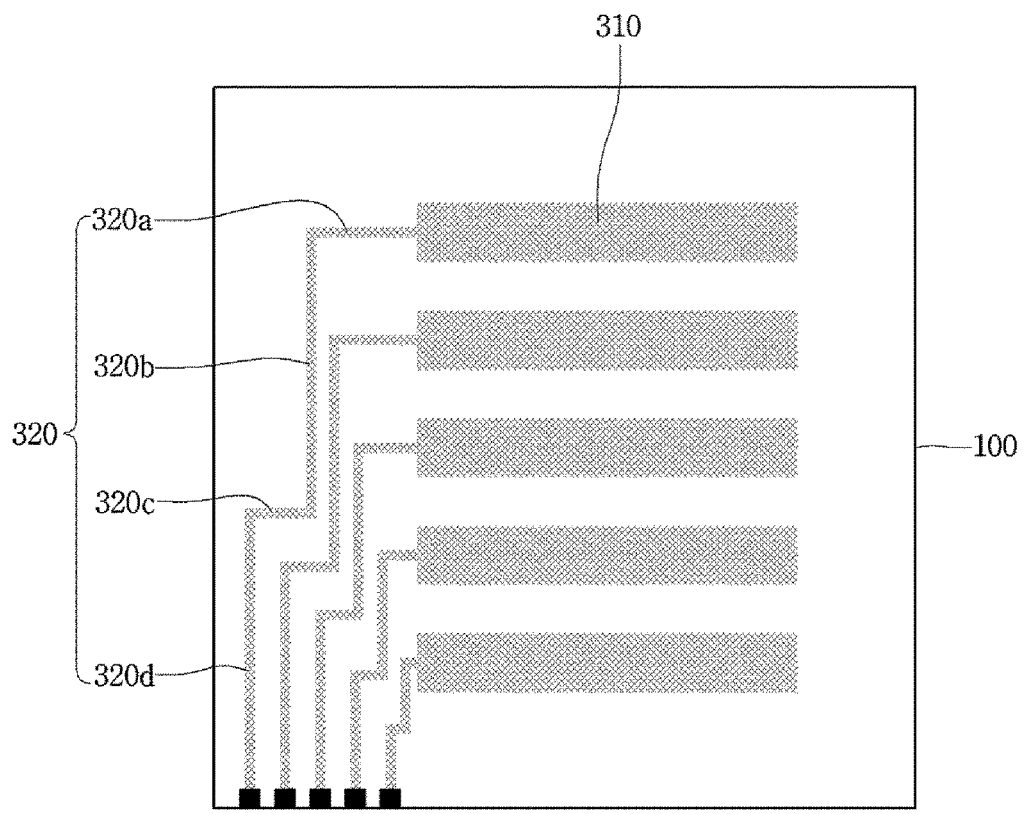
[FIG. 18]
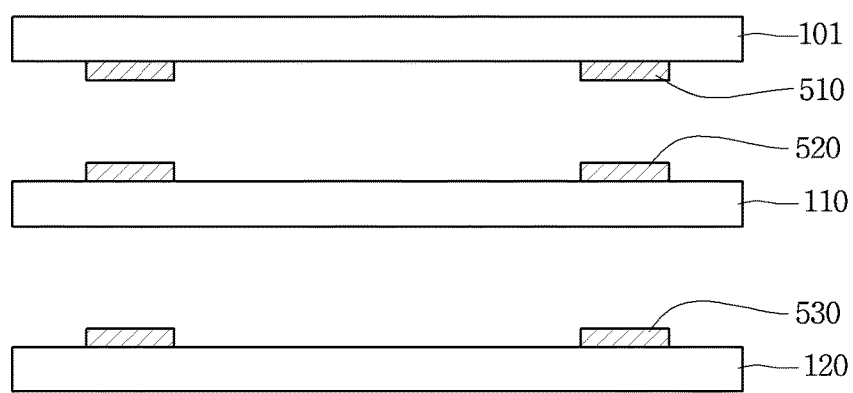

【FIG. 19】
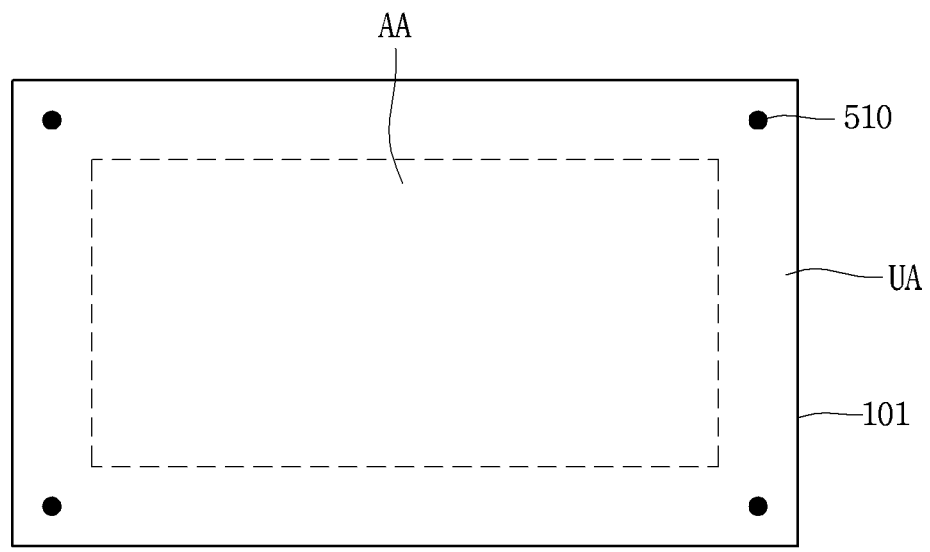
【FIG. 20】
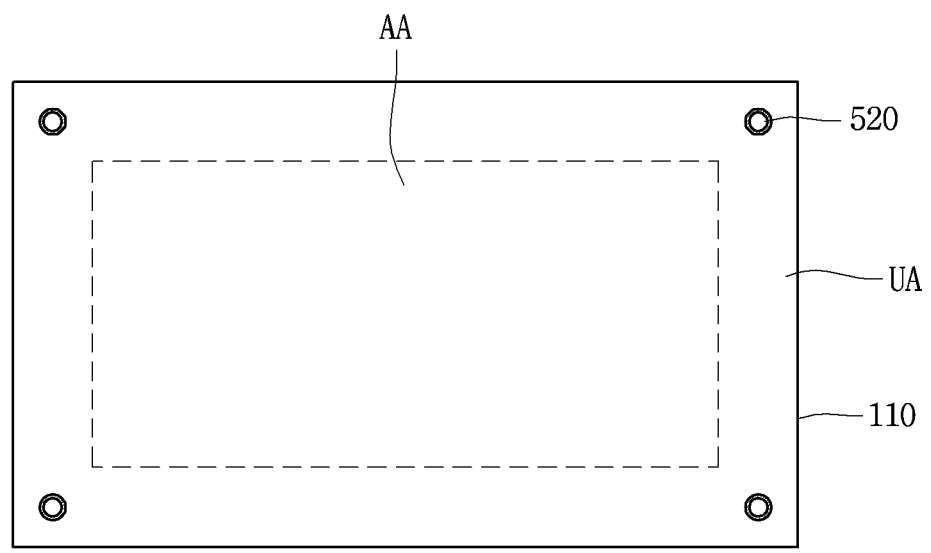

【FIG. 21】
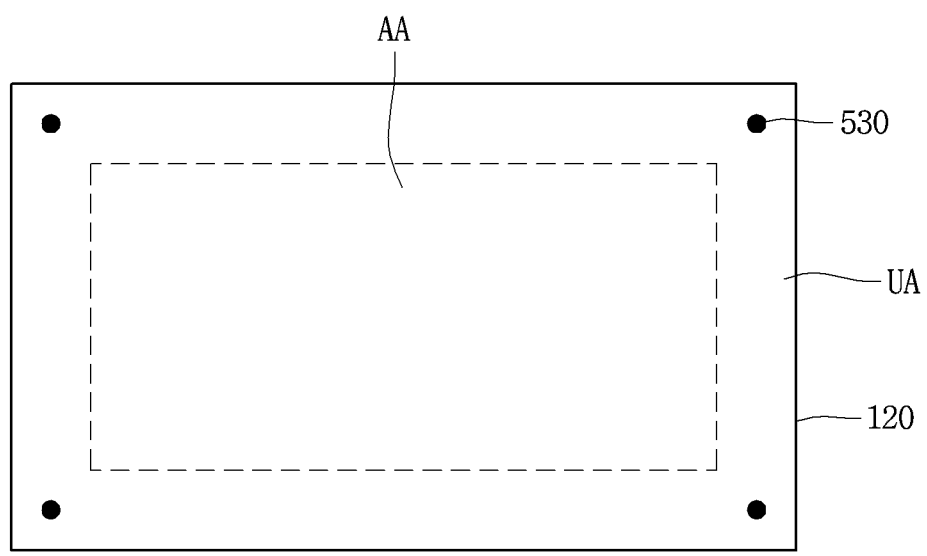
【FIG. 22】
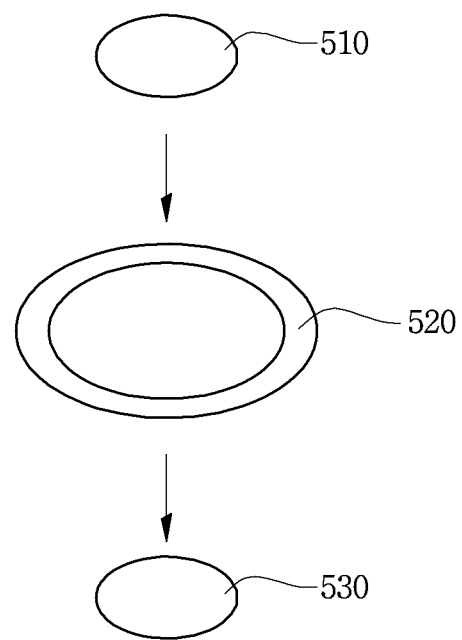

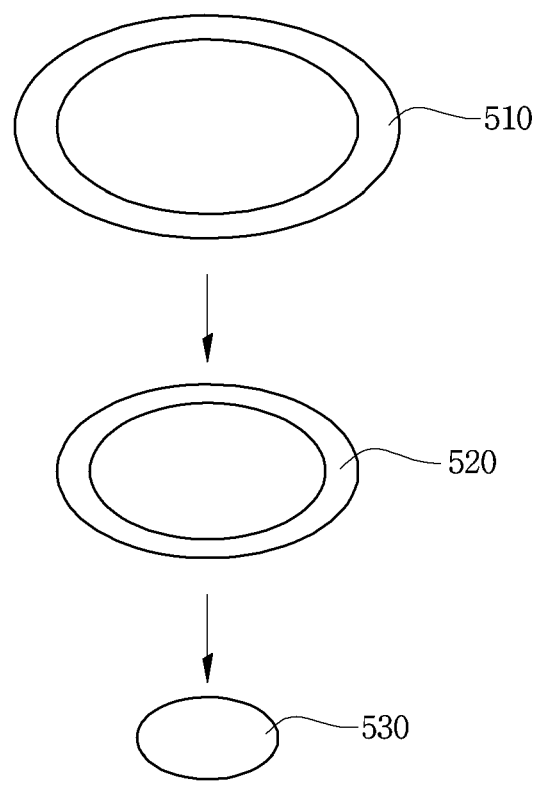
[FIG. 23]

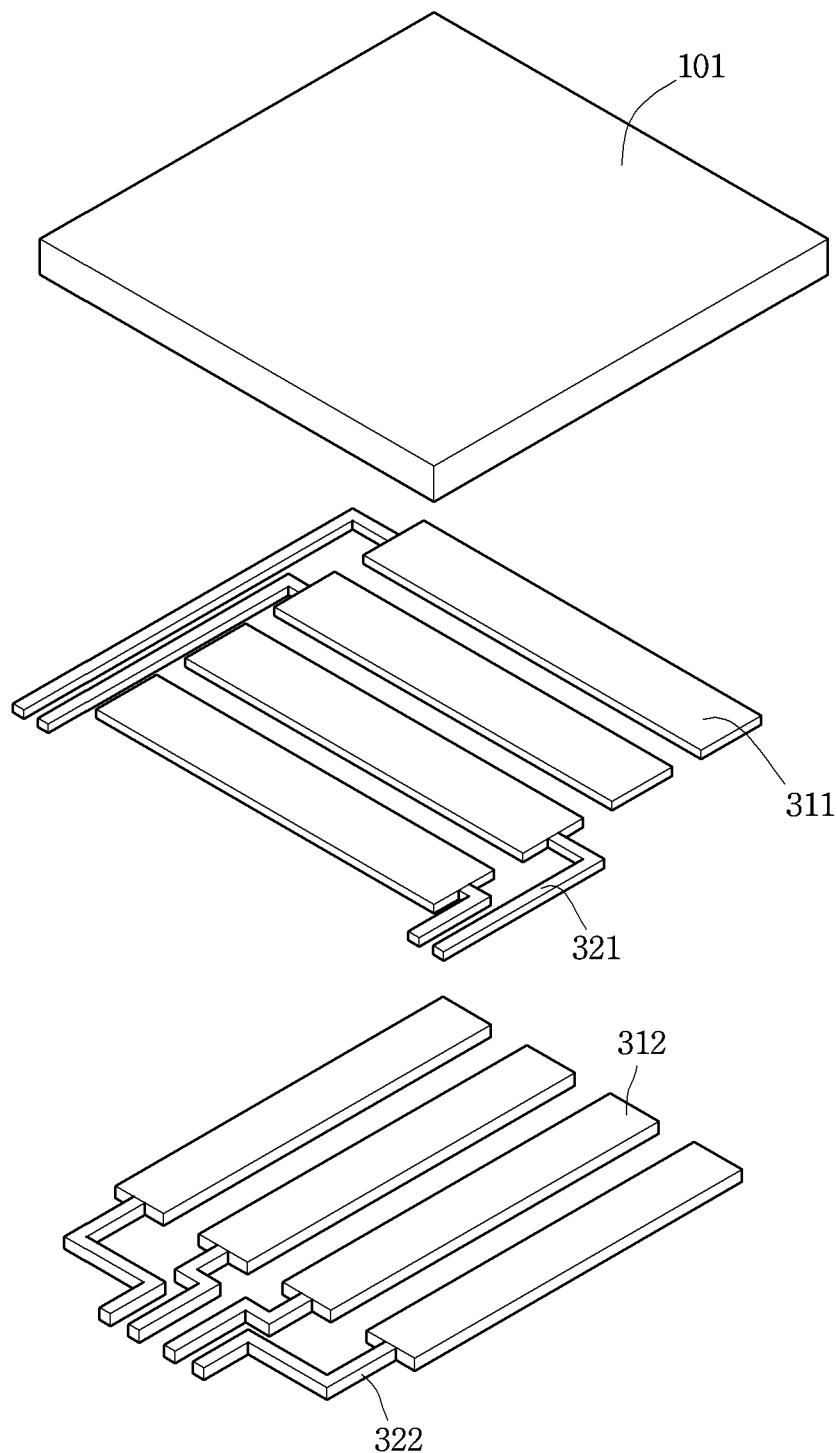
[FIG. 24]

[FIG. 25]
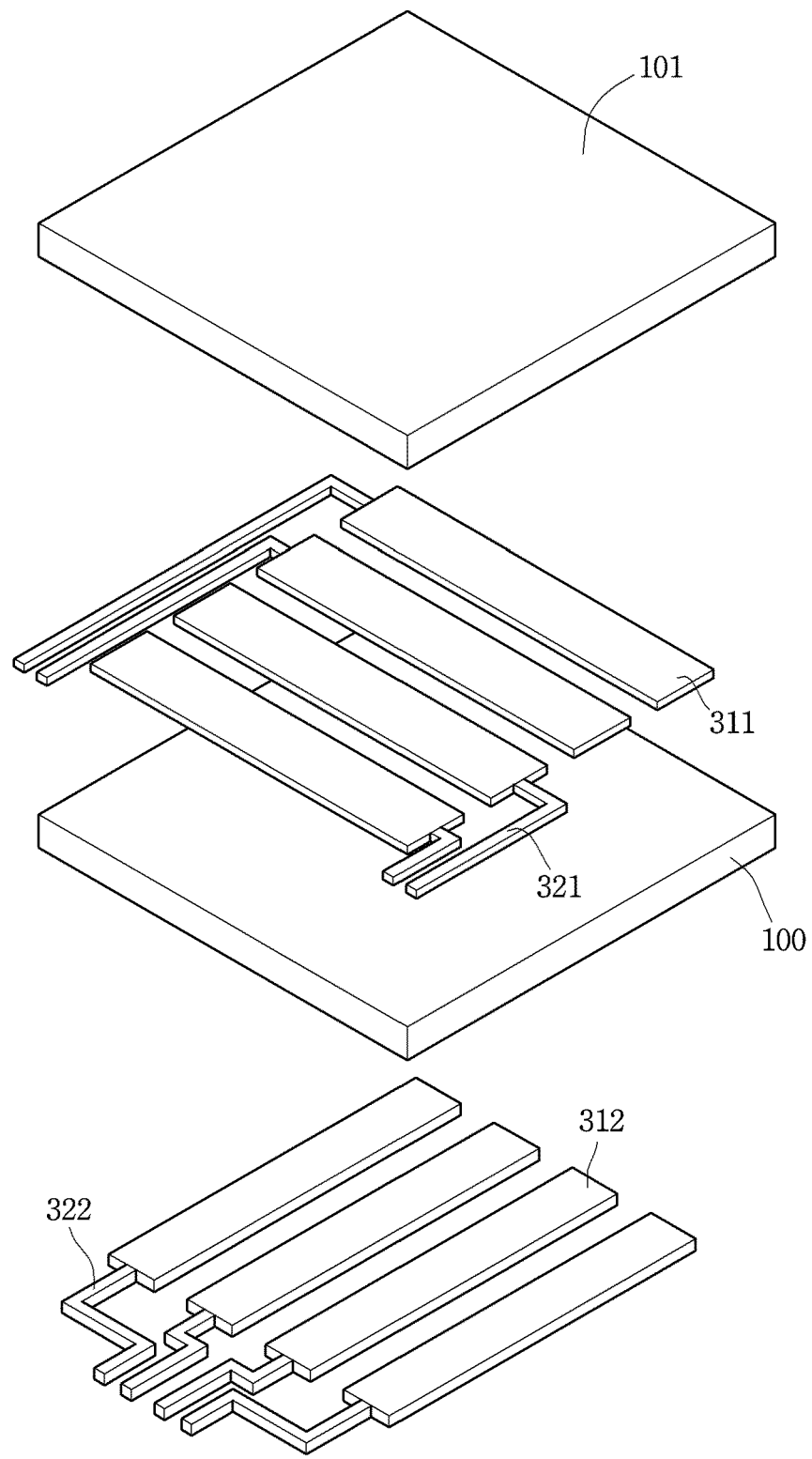

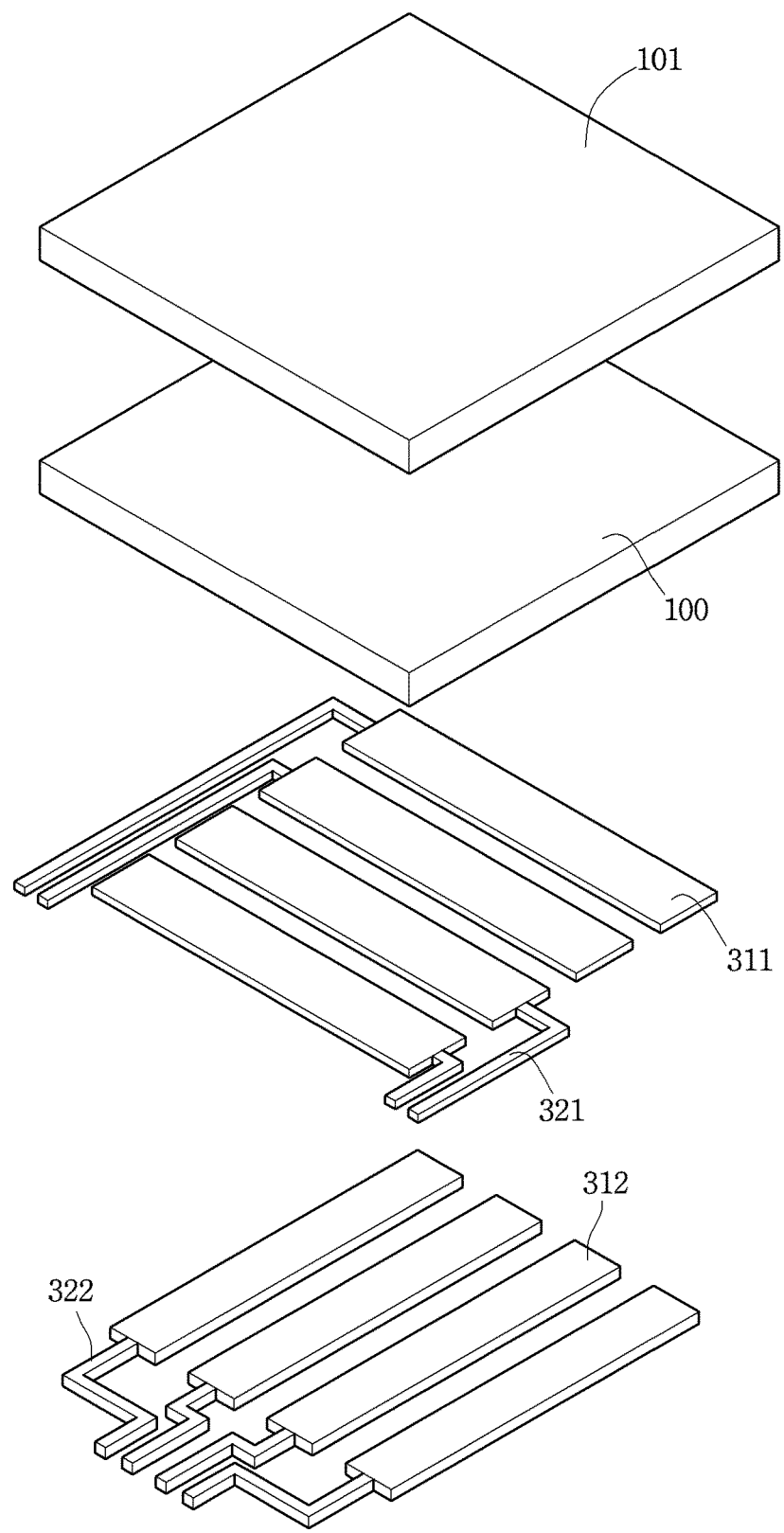
[FIG. 26]

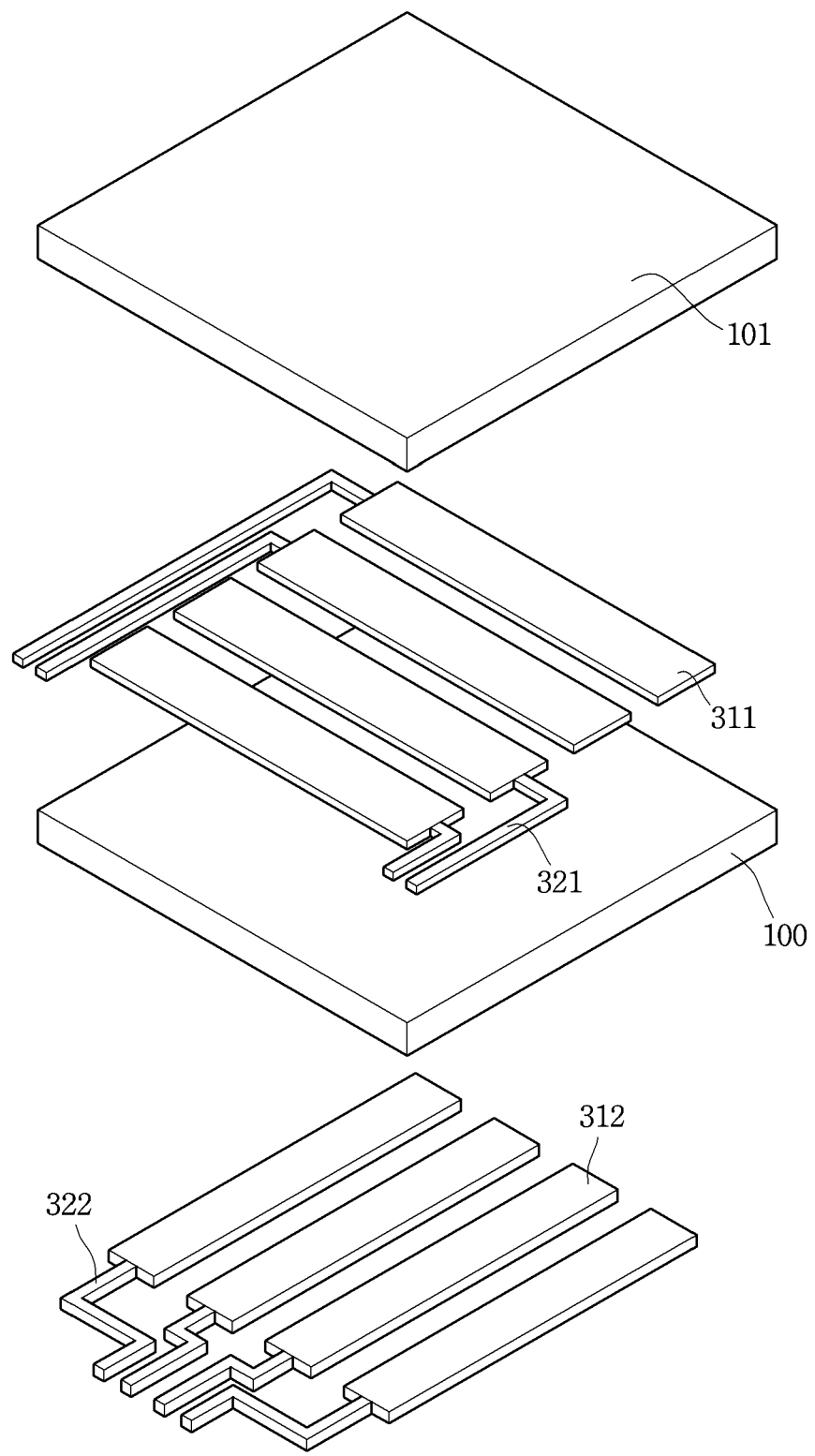
[FIG. 27]

[FIG. 28]
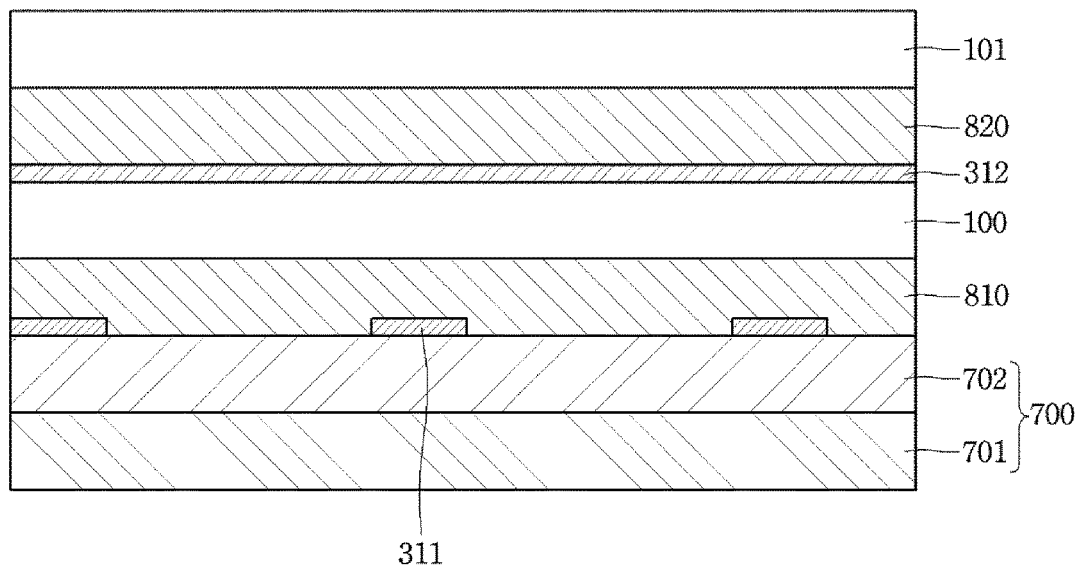
[FIG. 29]
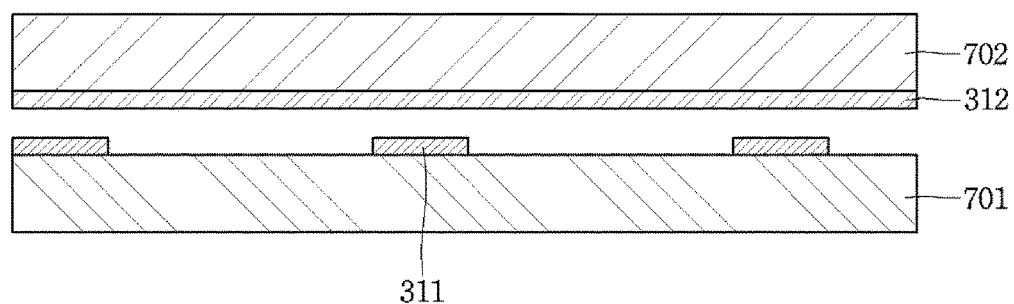

[FIG. 30]
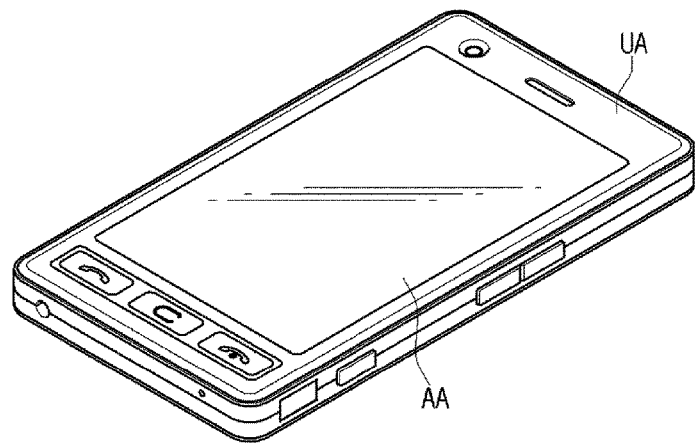
[FIG. 31]
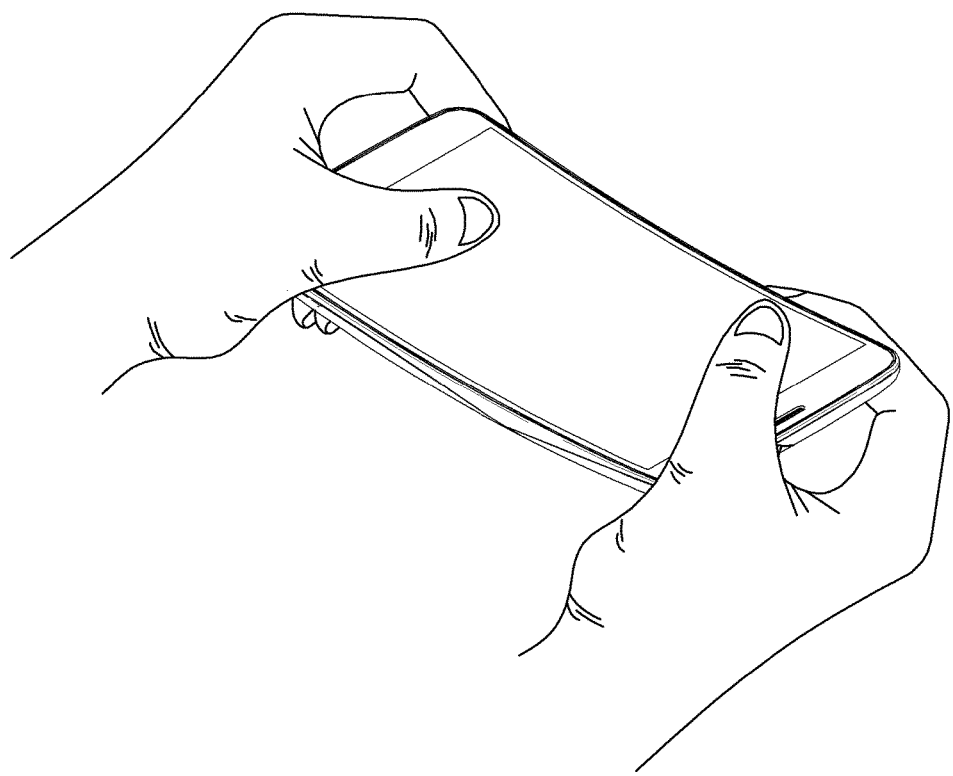

[FIG. 32]
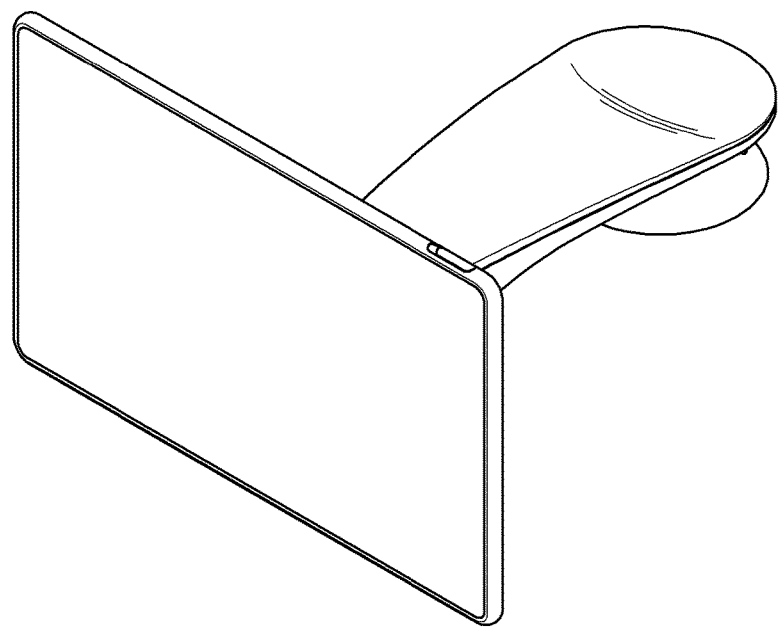
[FIG. 33]
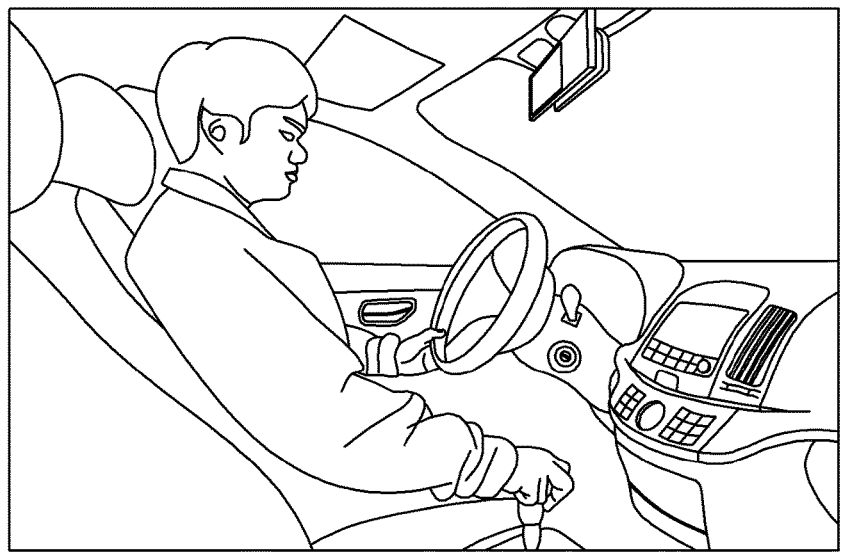

TOUCH WINDOW

CROSS-REFERENCE TO RELATED APPLICATIONS

This application claims priority under 35 U.S.C. §119 to Korean Application Nos. 10-2014-0007634 filed on Jan. 22, 2014, 10-2014-0008167 filed on Jan. 23, 2014 and 10-2014-0008168 filed on Jan. 23, 2014, whose entire disclosures are incorporated herein by reference.

BACKGROUND

1. Field

The embodiment relates to a touch window.

2. Background

Recently, a touch window, which performs an input function through the touch of an image displayed on a display device by an input device, such as a stylus pen, or a finger has been applied to various electronic appliances. Indium tin oxide (ITO) has been most extensively used as an electrode material of the touch window. However, since ITO has a limitation in the realization of low resistance due to an enlarged area, an electrode based on a metallic thin film mesh has been recently spotlighted as the electrode material.

The electrode of the touch window is formed through various schemes such as a scheme of filling a conductive material in a pattern. In this case, according to the scheme of filling the material in the pattern, the material is not filled in the pattern in uniform amount, so that the filling failure may occur.

BRIEF DESCRIPTION OF THE DRAWINGS

The embodiments will be described in detail with reference to the following drawings in which like reference numerals refer to like elements wherein:

FIG. 1 is a perspective view showing a touch window according to the first embodiment.

FIG. 2 is a sectional view taken along line A-A' of FIG. 1.

FIG. 3 is a sectional view showing a method of fabricating the touch window according to the first embodiment.

FIGS. 4 and 5 are sectional views showing various touch windows depending on the radiuses of curvature according to the first embodiment.

FIG. 6 is a plan view showing a touch window according to the second embodiment.

FIG. 7 is a sectional view taken along line B-B' of FIG. 6.

FIG. 8 is a plan view showing the touch window according to the second embodiment.

FIG. 9 is a sectional view taken along line C-C' of FIG. 8.

FIGS. 10 to 17 are plan views showing the touch window according to the second embodiment.

FIG. 18 is a sectional view showing the touch window according to the third embodiment.

FIG. 19 is a plan view showing a cover substrate according to the third embodiment.

FIG. 20 is a plan view showing a first substrate according to the third embodiment.

FIG. 21 is a plan view showing a second substrate according to the third embodiment.

FIGS. 22 and 23 are views showing the stacking structures of alignment parts according to the third embodiment.

FIGS. 24 to 27 are plan views showing various types of touch windows.

FIGS. 28 and 29 are sectional views showing various types of touch devices manufactured by combining the touch window according to the embodiment with the display panel.

FIGS. 30 to 33 are views showing one example of a touch device employing the touch window according to the embodiment.

DETAILED DESCRIPTION

A touch window according to the first embodiment is described in detail with reference to FIGS. 1 to 5. The touch window may include a substrate 100, a resin layer 200, and an electrode layer.

The substrate 100 may include a cover substrate. In addition, an additional substrate may be further provided on the substrate. The substrate may be combined with the cover substrate through an adhesive layer.

Referring to FIG. 1, a cover substrate 101 may be provided on the substrate 100 according to the first embodiment, and the substrate 100 may includes a first substrate 110 and a second substrate 120 on the first substrate 110. The cover substrate 101, the first substrate 110, and the second substrate 120 may be sequentially arranged.

The substrate 100 may be rigid or flexible. For example, the substrate 100 may include a glass substrate or a plastic substrate. The substrate 100 may include chemically tempered/semi-tempered glass, such as soda lime glass or aluminosilicate glass, reinforced/flexible plastic, such as polyimide (PI), polyethylene terephthalate (PET), propylene glycol (PPG), or poly carbonate (PC), or sapphire.

In addition, the substrate 100 may include an optically isotropic film. For example, the substrate 100 may include cyclic olefin copolymer (COO), cyclic olefin polymer (COP), optically isotropic polycarbonate (PC), or optically isotropic polymethyl methacrylate (PMMA)

Sapphire has superior electric characteristics, such as permittivity, so that a touch response speed may be greatly increased and a space touch such as hovering may be easily implemented. Since sapphire has high surface hardness, sapphire is applicable to a cover substrate. The hovering refers to a technique of recognizing coordinates even at a slight distance from a display.

The substrate 100 may also be bendable with a partially curved surface. In other words, the substrate 100 is bendable while a portion of the substrate 100 has a flat surface and another portion of the substrate 100 has a curved surface. An end portion of the substrate 100 may be bent with a curved surface or may be curved or bent with a surface having a random curvature. In addition, the substrate 100 may include a flexible substrate having a flexible property.

The substrate 100 may also include a curved substrate or a bended substrate. In other words, the touch window including the substrate 100 may be formed with a flexible, curving, or bending characteristic. Accordingly, the touch window according to the embodiment can be easily carried by a user and may be modified to touch windows having various designs.

The substrate 100 may have an active region AA and an unactive region UA defined therein. An image may be displayed in the active region AA, and may not be displayed in the unactive region UA provided at a peripheral portion of the active region AA.

A position of an input device (e.g., pen) can be detected at least one of the active region AA and the unactive region UA. If the input device such as the pen touches the touch window, the variation of capacitance occurs in the touched part by the input device, and the touched part subject to the variation of the capacitance may be detected as a touch point.

The resin layer 200 may be provided on at least one of the first and second substrates 110 and 120. Referring to FIG. 2, the resin layer 200 may be provided on the first substrate 110. The resin layer 200 may include an intaglio part 210 and an embossment part 220. The resin layer 200 may include the intaglio part 210 and the embossment part 220 adjacent to the intaglio part 210. The resin layer 200 may include a plurality of intaglio parts 210 and a plurality of embossment parts 220. The intaglio part 210 may be interposed between the embossment parts 220, or the embossment part 220 may be interposed between the intaglio parts 210.

The intaglio part 210 and the embossment part 220 may be formed through an imprinting process. For example, the intaglio part 210 and the embossment part 220 may be formed by arranging an intaglio mold or an embossment mold on the resin layer 200 and performing the imprinting process for the intaglio mold or the embossment mold.

The electrode layer may be provided on the resin layer 200. In detail, the electrode layer may be provided in the intaglio part 210 of the resin layer 200. The electrode layer may include a transparent conductive material allowing the flow of electricity without the interruption of light transmission. For example, the electrode layer may include metallic oxides, such as indium tin oxide, indium zinc oxide, copper oxide, tin oxide, zinc oxide, and titanium oxide.

The electrode layer may also include a nanowire, photosensitive nanowire film, carbon nanotube (CNT), graphene, conductive polymer, or the mixture thereof.

In addition, the electrode layer may include various metals. For example, the sensing electrode may include at least one of chromium (Cr), nickel (Ni), copper (Cu), aluminum (Al), silver (Ag), molybdenum (Mo), gold (Au), titanium (Ti), and the alloy thereof. The electrode layer may include a sensing electrode 310 and a wire electrode 320. The sensing electrode 310 may be provided in at least one of the active and unactive regions. In addition, the wire electrode 320 may be provided on the unactive region.

The sensing electrode 310 may include a first sensing electrode 311 provided on the first substrate 110 to extend in one direction and a second sensing electrode 312 provided on the second substrate 120 to extend in a direction different from the extension direction of the first substrate 110.

The wire electrode 320 may include a first wire electrode 321 provided on the first substrate 110 and a second wire electrode 322 provided on the second substrate 120. The first sensing electrode 311 may be connected with the first wire electrode 321, and the second sensing electrode 312 may be connected with the second wire electrode 322. At least one of the first and second wire electrodes 321 and 322 may be connected with a pad part 400 provided in the unactive region UA, and at least one of the first and second wire electrodes 321 and 322 may be connected with a printed circuit board through the pad part 400.

At least one of the sensing electrode 310 and the wire electrode 320 may be provided in a mesh shape. At least one of the sensing electrode 310 and the wire electrode 320 may include a plurality of sub-electrodes, and the sub-electrodes may cross each other in the mesh shape.

As at least one of the sensing electrode 310 and the wire electrode 320 has the mesh shape, an electrode pattern may not be viewed in the active region, for example a display region. In other words, even if the electrode includes metal, the electrode pattern may not be visible. In addition, even if the electrode is applied to a large size touch window, the resistance of the touch window may be reduced.

The embossment part 220 of the resin layer 200 may include a curved surface 221. In detail, a portion of the embossment part 220 without the electrode layer may have the curved surface 221. The curved surface 221 may be adjacent to the intaglio part 210. In other words, the curved surface 221 may be provided at an edge of the embossment part 220. Accordingly, the curved surface 2210 may be provided at an end portion of the embossment part 220. In addition, the curved surface 221 may be provided on an entire portion of the top surface of the embossment part 220.

The curved surface 2210 may be formed by performing the treatment for the surface of the embossment part 220. For example, the curved surface 2210 may be formed by exposing the embossment part 220 to an etchant for a predetermined time.

The embossment part 220 may have a width P in the range of 1 μm to 3000 μm. Accordingly, the touch sensitivity of the sensing electrodes provided in the intaglio parts 210 can be improved, and noise can be reduced. In this case, the width P of the embossment part 220 may include a width of the curved surface 221.

The radius R1 of curvature of the curved surface 221 may be equal to or less than the width P of the embossment part 220. For example, referring to FIG. 2, the radius R1 of the curvature may be less than the width P of the embossment part 220. In detail, the radius R1 of curvature may be 1/10 to one time as great as the width P of the embossment part 220. Therefore, the optical characteristic of the touch window can be improved. In other words, the brightness value can be increased due to the radius R1 of curvature, which represents the same principle as that of an optical sheet included in a liquid crystal display (LCD). Accordingly, the brightness or the transmittance of the touch window can be corrected.

As the radius R of curvature of the curved surface 221 is changed, the embossment part 220 may have the same shape as those shown in FIGS. 4 and 5. In other words, as the radius R of curvature is increased, the embossment part 220 may sequentially the same shape as that shown FIG. 2 (see R1), FIG. 4 (see R2), and FIG. 5 (see R3).

The filling rate of the conductive material filled in the intaglio part 210 may be improved due to the curved surface 221. In detail, referring to FIG. 3, a conductive material 301 may be filled in the intaglio part 210 as a doctor knife D is moved in contact with the resin layer 200. The doctor knife D may improve the contact characteristic with the embossment part 220. In other words, the curved surface 221 included in the embossment part 220 can prevent the embossment part 220 from being damaged due to the collision or friction between the doctor knife D and the embossment part 220.

In addition, since foreign matters may be produced as the embossment part 220 is damaged, the electrode failure, such as the open or the short of the electrode, can be improved. Accordingly, the productivity and the reliability of the touch window can be improved.

A touch window according to the second embodiment will be described with reference to FIGS. 6 to 17. In the following description about the touch window according to the second embodiment, the details of the structures and the components the same as those of the touch window according to the first embodiment described above will be omitted. In addition, the same reference numerals will be assigned to elements the same as those of the touch window according to the first embodiment.

Referring to FIGS. 6 to 17, the touch window according to the second embodiment may include a substrate 100, a resin layer 200, and an electrode layer. The substrate 100 may include an active region AA and an unactive region UA. The resin layer 200 may be provided on the substrate 100. For example, the resin layer 200 may be provided on the active region AA and the unactive region UA.

The resin layer 200 may include an intaglio part 210. For example, the resin layer 200 may include first and second intaglio parts 211 and 212. In detail, the first intaglio part 211 may be provided in the active region AA, and the second intaglio part 212 may be provided on the unactive region UA. A sensing electrode 310 may be provided on the first intaglio part 211, and a wire electrode 320 may be provided on the second intaglio part 211.

As shown in FIG. 6, although the sensing electrode 310 has a bar shape, the embodiment is not limited thereto. The sensing electrode 310 on the first intaglio part 211 may have a mesh shape. The sensing electrode 310 may include a plurality of sub-electrodes, and the sub-electrodes may cross each other in the mesh shape.

The mesh shape may be randomly formed to prevent a moiré phenomenon. The moiré phenomenon occurs when periodical stripes overlap with each other. Since adjacent stripes overlap with each other, a thickness of a stripe is thickened so that the stripe is spotlighted as compared with other stripes. In order to prevent the moiré phenomenon, the mesh shape of the sensing electrode may be variously formed.

In detail, as the sensing electrode 310 has a plurality of sub-electrodes crossing each other in the mesh shape, the sensing electrode 310 may include a first mesh line LA1 and a mesh opening part OA interposed between first mesh lines LA1.

The first line width T1 of the first mesh line LA1 may be in the range of about 0.1 µm to about 10 µm. If the first line width T1 of the first mesh line LA1 is about 0.1 µm or less, a mesh line part may not be manufactured, or the short of the mesh line may occur. If the first line width T1 of the first mesh line LA1 exceeds 10 µm, an electrode pattern is viewed from the outside, so that the visibility can be degraded. Preferably, the first line width T1 of the first mesh line LA1 may be in the range of 0.5 µm to about 7 µm. More preferably, the first lien width T1 of the first mesh line LA1 may be in the range of about 1 µm to about 3.5 µm.

In addition, a mesh opening part may have various shapes. For example, the mesh opening may have a polygonal shape, such as a rectangular shape, a diamond shape, a pentagonal shape, or a hexagonal shape, or a circular shape. In addition, the mesh opening part may have a regular shape or a random shape.

As the sensing electrode 310 has the mesh shape, a sensing electrode pattern may not be viewed in the active region, for example a display region. In other words, even if the sensing electrode includes metal, the sensing electrode pattern may not be viewed. In addition, even if the sensing electrode is applied to a large size touch window, the resistance of the touch window may be reduced.

The wire electrode 320 may be provided on the second intaglio part 212. The wire electrode 320 is connected with the sensing electrode 310 to apply an electrical signal to the sensing electrode 310. The sensing electrode 310 and the wire electrode 320 provided on the first and second intaglio parts 211 and 212, respectively, may be formed through the same process, so that the process number can be reduced.

The first intaglio part 201 may have a depth different from a depth of the second intaglio part 301. In detail, a depth D2 of the second intaglio part 212 having the wire electrode 320 may be greater than a depth D1 of the first intaglio part 211 having the second electrode 310. Accordingly, the line width of the wire electrode 320 can be reduced. In other words, even if the wire electrode 320 has a narrow line width, the narrow line width of the wire electrode 320 may be compensated by the depth D2 of the second intaglio part 212.

Therefore, even if the line width of the wire electrode 320 is reduced, the same conductive material 301 may be filled, and the same resistance can be ensured. Therefore, the line width of the wire electrode 320 can be reduced, so that a bezel area can be reduced.

In addition, a line width W1 of the wire electrode 320 may approximate to a first line width T1 of a first mesh line LA1 of the sensing electrode 310. In detail, the ratio of the line width W1 of the wire electrode 320 to the first line width T1 in size may be in the range of 0.5:1 to 5:1. Accordingly, the ink filling property can be improved, and the reliability of the sensing electrode 310 and the wire electrode 320 can be improved.

If the line width W1 of the wire electrode 320 is less than the first line width T1 of the first mesh line LA1 of the sensing electrode 310, the depth D2 of the second intaglio part 212 may be higher than the depth D1 of the first intaglio part 211.

If the line width W1 of the wire electrode 320 is higher than the first mesh line LA1 of the sensing electrode 310, the depth D2 of the second intaglio part 212 may be lower than the depth D1 of the first intaglio part 211.

Since the wire electrode 320 and the sensing electrode 310 may be formed through the same process, the wire electrode 320 and the sensing electrode 310 may include the same material or similar materials.

The line width W1 of the wire electrode 320 may be less than a distance between the wire electrodes 320. For example, the width W1 of the wire electrode 320 may be in the range of 20 µm to 30 µm. If the width W1 of the wire electrode 320 may be less than 20 µm, the resistance of the wire electrode 320 may be increased. If the width W1 of the wire electrode 320 may be greater than 30 µm, the bezel area may be increased.

In addition, a distance S between the wire electrodes 320 may be greater than the line width W1 of the wire electrode 320, and may be in the range of 30 µm to 50 µm. If the distance S between the wire electrodes 320 may be less than 30 µm, the wire electrodes 320 may exert an influence on an adjacent wire electrode 320 when the wire electrodes 320 are formed. In addition, if the distance S between the wire electrodes 320 is greater than 50 µm, the whole width of the bezel may be increased to limit a design.

A pad part 400 is provided at one end of the wire electrode 320. The pad part 400 may be connected with a printed circuit board. In detail, although not shown in drawings, a connector may be placed on any one surface of the printed circuit board, and the pad part 400 may be connected with the connector. The pad part 400 may have a size corresponding to the connector.

The printed circuit board may include various types of printed circuit boards. For example, the printed circuit board may include flexible printed circuit board (FPCB). The wire electrode 320 may be connected with the printed circuit board through the pad part 400.

FIG. 8 is another plan view showing the touch window according to the second embodiment, and FIG. 9 is a sectional view taken along line C-C' of FIG. 8. The wire electrode 320 may be provided in a mesh shape. In other words, both of the sensing electrode 310 and the wire electrode 320 may be provided in the mesh shape.

For example, the sensing electrode 310 may include a first mesh line LA1, and the wire electrode 320 may include a second mesh line LA2.

The ratio of a second line width T2 of the second mesh line LA2 to a first line width T1 of the first mesh line LA1 may be in the range of 0.5:1 to 5:1. In addition, the second line width T2 may have the size corresponding to that of the first line width T1.

The second line width T2 may have the same size as that of the first line width T1. Therefore, when conductive materials are filled in the first and second intaglio parts 211 and 212, the filling property can be improved.

FIGS. 10 to 17 are other plan views showing the touch window according to the second embodiment. Referring to FIGS. 10 and 11, the wire electrode 320 of the touch window according to another embodiment may include a curved line. In other words, the wire electrode 320 may have at least one of a linear line or a curved line. Accordingly, the ink flowing property of the wire material filled in the intaglio part can be increased, and the filling rate and the filling property can be improved. In addition, referring to FIG. 11, the sensing electrode 310 and the wire 320 may have the mesh shape.

Referring to FIGS. 12 and 13, the wire electrode 320 of the touch window according to still another embodiment may include parts having widths different from each other. In detail, one end of the wire electrode 320 may be connected with the sensing electrode 310, and an opposite end of the wire electrode 320 may be connected with the printed circuit board through the pad part 400. The wire electrode 320 may extend with a width varied from one end toward the opposite end.

For example, the wire electrode 320 may extend from one end toward the opposite end, and may have a width changed from the first width W2 toward the second width W3. In this case, the first width W2 may be wider than the second width S3. The wire electrode 320 may include various parts having mutually different widths, so that the ink flowing property of the wire material filled in the intaglio part can be increased, and the filling rate and the filling property can be improved. Referring to FIG. 13, the sensing electrode 310 and the wire electrode 320 may have the mesh shape.

Referring to FIGS. 14 and 15, the wire electrode 320 of the touch window according to still another embodiment may include parts having different shapes. For example, the sub-wire electrode 320 may include a linear shape and a circular shape. In this case, the third width W4 of the linear shape wire electrode 320 may be different from the fourth width W5 of the circular shape wire electrode 320. The wire electrode 320 may variously include parts having mutually different shapes and parts having mutually different line widths, so that the ink flowing property of the wire material filled in the intaglio part can be increased, and the filling rate and the filling property can be improved. In addition, referring to FIG. 15, the sensing electrode 310 and the wire electrode 320 may have a mesh shape.

Referring to FIGS. 16 and 17, the wire electrode 320 of the touch window according to still another embodiment may include a plurality of sub-wire electrodes having mutually different directionalities. For example, the wire electrode 320 may include a plurality of sub-wire electrodes extending in mutually different directions.

For example, the wire electrode 320 may include a first sub-wire electrode 320a and a second sub-wire electrode 320b extending from the first sub-wire electrode 320a. In this case, an angle θ1 between the first and second sub-wire electrodes 320a and 320b may be in the range of 10° to 170°.

In addition, the wire electrode 320 may further include a third sub-wire electrode 320c extending from the second sub-wire electrode 320b and having a directionality different from that of the second sub-wire electrode 320b. An angle θ2 between the second sub-wire electrode 320b and the third sub-wire electrode 320c may be in the range of 10° to 170°. In addition, the wire electrode 320 may further include a fourth sub-wire electrode 320d extending from the third sub-wire electrode 320c and having directionality different from that of the third sub-wire electrode 320c. An angle θ3 between the third sub-wire electrode 320c and the fourth sub-wire electrode 320d may be in the range of 10° to 170°. When the angle θ1 between the first and second sub-wire electrodes 320a and 320b, the angle θ2 between the second and third sub-wire electrode 320b and 320c, and the angle θ3 between the third and fourth sub-wire electrode 320c and 320d are less than 10° or greater than 170°, and when the wire material is filled in the intaglio part, a part that is not filled with ink may be generated. In other words, the filling rate of the ink may be degraded.

The wire electrode 320 may include inflected parts C1, C2, and C3 at which directionality is changed. The number of the inflected parts C1, C2, and C3 may be less than the number of wire electrodes 320. Accordingly, the ink flowing property of the wire material filled in the intaglio part can be increased, and the filling rate and the filling property can be improved. In addition, referring to FIG. 17, the sensing electrode 310 and the wire electrode 320 may have the mesh shape.

A touch window according to the third embodiment will be described with reference to FIGS. 18 to 23. The touch window according to the third embodiment may include a cover substrate 101, a first substrate 110, and a second substrate 120 that are sequentially provided. In the following description about the touch window according to the third embodiment, the details of the structures and the components the same as those of the touch window according to the first and second embodiments described above will be omitted. In addition, the same reference numerals will be assigned to elements the same as those of the touch window according to the first and second embodiments.

The cover substrate 101, the first substrate 110, and the second substrate 120 may include alignment parts. In detail, the alignment parts may be formed at edges of the cover substrate 101, the first substrate 110, and the second substrate 120. In more detail, the alignment parts may be provided on the unactive region UA of the cover substrate 101, the first substrate 110, and the second substrate 120.

The cover substrate 101 may include a first alignment part 510. In addition, the first substrate 110 may include a second alignment part 520. In addition, the second substrate 120 may include a third alignment part 530.

The first to third alignment parts 510 to 530 may be provided at positions overlapped with each other. In other words, when the cover substrate 101, the first substrate 110, and the second substrate 120 are stacked on each other, the first to third alignment parts 510 to 530 may be overlapped with each other.

The second and third alignment parts 520 and 530 may be formed through a process the same as a process of forming the sensing electrodes. In other words, the second and third alignment parts 520 and 530 may be formed by forming an embossment region or an intaglio region on the resin layer using a mold in the resin layer formed on the substrate and then coloring the embossment region or the intaglio region using a coloring material.

The first, second, and third alignment parts 510, 520, and 530 may have the same shape. Although the alignment parts are shown in a circular shape, the embodiment is not limited thereto. In other words, the first to third alignment parts 510, 520, and 530 may be formed in various shapes such as a triangular shape or a rectangular shape. In addition, the first, second, and third alignment parts 510, 520, and 530 may have mutually different shapes. The first to third alignment parts 510 to 530 may have at least one of a dot shape and a ring shape. Although drawings show that the alignment parts have a circular dot shape or a circular ring shape, the embodiment is not limited thereto. In other words, the alignment parts may have various polygonal dot and ring shapes such as a triangular dot and ring shape or a square dot and ring shape.

The first to third alignment parts 510 to 530 may have mutually different sizes. At least two of the first to third alignment parts 510 to 530 may have mutually different sizes. The first to third alignment parts 510 to 530 may have widths of about 2 mm or less. If the alignment parts have the widths exceeding about 2 mm, the width of the bezel area is increased, so that the touch window can be realized in small size.

The first to third alignment parts 510 to 530 may be formed at a distance of about 1 mm to about 10 mm from the active region AA. If the distance is less than about 1 mm, the alignment parts may be moved into the active region due to the tolerance when the alignment parts are stacked, so that the visibility may be degraded. If the distance exceeds about 10 mm, the bezel region, that is, the unactive region is widened, so that the touch window may not be realized in small size.

Referring to FIG. 22, the cover substrate 101 may include the first alignment part 510 having the first dot shape, the first substrate 110 may include the second alignment part 520 having a ring shape overlapped with the first dot shape, and the second substrate 120 may include the third alignment part 530 having the second dot shape overlapped with the ring shape.

The first alignment part 510 may not be overlapped with the second alignment part 520, but may be provided inside the second alignment part 520 having a ring shape. In addition, the second and third alignment parts 520 and 530 may be overlapped with each other, and the third alignment part 530 may be provided inside the second alignment part 520 having the ring shape.

Referring to FIG. 23, the cover substrate 101 may include the first alignment part 510 having a first ring shape, the first substrate 110 may include the second alignment part 520 having a second ring shape overlapped with the first ring shape, and the second substrate 120 may include the third alignment part 530 having the dot shape overlapped with the second ring shape.

The first alignment part 510 may be greater than the second alignment part 520. In other words, the first and second alignment parts 510 and 520 may be overlapped with each other, and the second alignment part 520 may be provided inside the first alignment part 510. The third alignment part 530 may be overlapped with the second alignment part 520, and may be provided inside the first alignment part 510 and/or the second alignment part 520.

The embodiment is not limited to the structure shown in FIGS. 22 and 23. In other words, the first to third alignment parts 510 to 530 are overlapped with each other, and at least one of the first to third alignment parts 510 and 530 may be provided in various shapes inside another alignment part.

The touch window according to the third embodiment includes alignment parts formed in a cover substrate, or a substrate(s). The alignment parts may be formed in the same shape or mutually different shapes, or in the same size or mutually different sizes so that the electrodes can be prevented from being offset due to the tolerance when the cover window and the substrates are stacked.

Therefore, in the touch window according to the third embodiment, align marks formed on the cover substrate, the first substrate, and the second substrate are overlapped with each other with mutually different sizes. Therefore, even if the positions of the align marks are partially offset from each other due to the contraction of the substrate, the alignment parts having mutually different sizes may be exposed. Accordingly, when another substrate or the cover window is stacked, the offset resulting from the contraction of the substrate can be prevented.

Therefore, in the touch window according to the third embodiment, tolerance resulting from the contraction of the substrate caused during the process can be prevented, so that the electrodes can be prevented from being offset, thereby improving the whole reliability and the whole efficiency of the touch window.

Hereinafter, various types of touch windows will be described with reference to FIGS. 24 to 27. The touch window according to the first to third embodiments described above may be applied to various types of touch windows.

Referring to FIG. 24, the touch window according to the embodiment may include the cover substrate 101, and the first and second sensing electrodes 210 and 220 on the cover substrate 101. The cover substrate 101 is provided on one surface thereof with first and second sensing electrodes 311 and 312 extending in mutually different directions and first and second wire electrodes 321 and 322 connected with the first and second sensing electrodes 311 and 312, respectively. The first and second sensing electrodes may be provided on the same surface of the cover substrate 101 while being insulated from each other.

In other words, the first sensing electrode 311 may extend in one direction, and the second sensing electrode 312 may extend in a direction different from one direction. In addition, at least one of the first and second sensing electrodes 311 and 312 may have a mesh shape.

Referring to FIG. 25, the touch window according to the embodiment may include the cover substrate 101 and the substrate 100, and may include the first sensing electrode on the cover substrate 101 and the second sensing electrode on the substrate 100.

In detail, the cover substrate 101 may be provided on one surface thereof with the first sensing electrode extending in one direction and the first wire electrode 321 connected with the first sensing electrode 311. The substrate 100 may be provided on one surface thereof with the sensing electrode 312 extending in a direction different from one direction and the second wire electrode 322 connected with the second sensing electrode 312.

The cover substrate 101 may be bonded to the substrate 100 through an optical clear adhesive (OCA). In addition, at least one of the first and second sensing electrodes 311 and 312 may have the mesh shape.

Referring to FIG. 26, the touch window according to the embodiment may include the cover substrate 101 and the substrate 100, and may include the first and second sensing electrodes 210 and 220 on the substrate 100. The substrate may be provided on one surface thereof with the first and second sensing electrodes extending in mutually different directions, and the first and second sensing electrodes 311 and 312 may be provided on the same surface of the substrate 100 while being insulated from each other.

The cover substrate 101 may be bonded to the substrate 100 through an optical clear adhesive (OCA). At least one of the first and second sensing electrodes 311 and 312 may have a mesh shape.

Referring to FIG. 27, the touch window according to the embodiment may include the cover substrate 101 and the substrate 100, and may include the first and second sensing electrodes on the substrate 100. The substrate 100 may be provided on one surface thereof with the first sensing electrode 311 extending in one direction and the first wire electrode 321 connected with the first sensing electrode 311. The substrate 100 may be provided on an opposite surface to one surface thereof with the second sensing electrode 312 extending in a direction different from one direction and the second wire electrode 322 connected with the second sensing electrode 312.

The cover substrate 101 may be bonded to the substrate 100 through an optical clear adhesive (OCA). At least one of the first and second sensing electrodes 311 and 312 may have a mesh shape.

The touch window including the above-described dummy part and the touch device coupled to the display panel will be described with reference to FIGS. 28 and 29. Referring to FIG. 28, the touch device according to the embodiment may include a touch window formed integrally with a display panel 700. A substrate to support at least one sensing electrode may be omitted.

At least one sensing electrode may be formed on at least one surface of the display panel 700. The display panel 700 may include a first prim substrate 701 and a second prim substrate 702. In other words, at least one sensing electrode may be formed on at least one surface of the first prime substrate 701 and the second prim substrate 702.

When the display panel 700 is a liquid crystal display panel, the display panel 700 may be formed in a structure in which the first prim substrate 701 including a thin film transistor (TFT) and a pixel electrode is combined with the second prim substrate 702 including color filter layers while a liquid crystal layer is interposed between the first and second prim substrates 701 and 702.

In addition, the display panel 700 may be a liquid crystal display panel having a COT (color filter on transistor) structure in which a thin film transistor, a color filter, and a black matrix are formed on the first prim substrate 701, and the first prim substrate 701 is combined with the second prim substrate 702 while a liquid crystal layer is interposed between the first and second prime substrates 701 and 702.

The thin film transistor may be formed on the first prim substrate 701, the protective layer may be formed on the thin film transistor, and the color filter layer may be formed on the protective layer. In addition, the pixel electrode making contact with the thin film transistor is formed on the first prim substrate 701. In this case, in order to improve the opening rate and simplify the mask process, the black matrix may be omitted, and the common electrode may serve as the black matrix.

When the display panel 700 is a liquid crystal panel, the display device may further include a backlight unit for providing light from the rear surface of the display panel 700.

When the display panel 700 is an organic light emitting device, the display panel 700 includes a self light-emitting device which does not require any additional light source. The display panel includes a thin film transistor formed on the first prim substrate and an organic light emitting device (OLED) making contact with the thin film transistor. The OLED may include an anode, a cathode and an organic light emitting layer formed between the anode and the cathode. In addition, the second prim substrate 702 may be further formed on the organic light emitting device to perform the function of an encapsulation substrate for encapsulation.

In this case, at least one sensing electrode may be formed on the top surface of an upper substrate. Although drawings show the structure in which the sensing electrode is formed on the top surface of the second prim substrate 702, when the first prim substrate 701 may serve as the upper substrate, at least one sensing electrode may be formed on the top surface of the first prim substrate 701.

Referring to FIG. 28, the first sensing electrode 311 may be formed on the top surface of the display panel 700. The first wire connected with the first sensing electrode 311 may be formed. The substrate 100 having the second sensing electrode 312 and the second wire may be formed on the display panel 700 having the first sensing electrode 311. A first adhesive layer 810 may be interposed between the substrate 100 and the display panel 700.

Although drawings show that the second sensing electrode 312 is formed on the top surface of the substrate 100, and the cover substrate 101 is provided on the substrate 100 while a second adhesive layer 820 is interposed between the substrate 100 and the cover substrate 101, the embodiment is not limited thereto. The second sensing electrode 312 may be formed on the rear surface of the substrate 100. In this case, the substrate 100 may serve as a cover substrate.

The embodiment is not limited to drawings, but may employ various structures in which the first sensing electrode 312 is formed on the top surface of the display panel 700, the substrate 100 to support the second sensing electrode 312 is provided on the display panel 700, and the substrate 100 is combined with the display panel 700.

The substrate 100 may be a polarizing plate. The second sensing electrode 312 may be formed on the top surface or the rear surface of the polarizing plate. Accordingly, the second sensing electrode may be formed integrally with the polarizing plate.

Further, a polarizing plate may be provided separately from the substrate 100. In this case, the polarizing plate may be provided under the substrate 100. The polarizing plate may be interposed between the substrate 100 and the display panel 700. In addition, the polarizing plate may be provided above the substrate 100.

The polarizing plate may be a linear polarizing plate or an anti-reflection polarizing plate. For example, when the display panel 700 is a liquid crystal display panel, the polarizing plate may be a linear polarizing plate. In addition, when the display panel 700 is an organic electroluminescent display panel, the polarizing plate may be an anti-reflection polarizing plate.

Referring to FIG. 29, the first sensing electrode 311, the second sensing electrode 312, the first wire, and the second wire may be interposed between the first prim substrate 701 and the second prim substrate 702. In other words, the first sensing electrode 311, the second sensing electrode 312, the first wire, and the second wire may be provided inside the display panel.

The first and second sensing electrodes 311 and 312 may be provided on at least one of the first prim substrate 701 and the second prim substrate 702 between the first and second prim substrates 701 and 702.

One example of the touch device employing the touch window according to the embodiments will be described with reference to FIGS. 30 to 33. Referring to FIG. 30, as one example of the touch device, a mobile terminal is shown. The mobile terminal may include the active region AA and the unactive region UA. The active region AA may be provided to detect a touch signal generated from the touch by a finger, and the unactive region UA may be provided therein with a command icon pattern part and a logo.

Referring to FIG. 31, the touch window may include a flexible touch window that may be bent. Accordingly, the touch device including the touch window may be a flexible touch device. Accordingly, a user can curve or bend the touch device with the hand of the user.

Referring to FIG. 32, the touch window may be applied to a vehicle navigation as well as a touch device such as a mobile terminal.

Referring to FIG. 33, the touch window may be applied into a vehicle. In other words, the touch window may be applied to various parts in the vehicle, which allow the application of the touch window. Accordingly, the touch window is applied to a dashboard as well as a PND (Personal Navigation Display), thereby realizing a CID (Center Information Display). However, the embodiment is not limited to the embodiment. In other words, the display may be used in various electronic products.

The embodiment provides a touch window having improved reliability.

A touch window includes a substrate including an active region and an unactive region, a resin layer provided on the substrate and includes an intaglio part and an embossment part adjacent to the intaglio part, and an electrode layer in the intaglio part. The embossment part includes a curved surface.

As described above, as the curved surface is included in the embossment part of the resin layer, when the conductive material is filled in the intaglio part, the embossment part can be prevented from being damaged due to the collision or the friction between the doctor knife and the embossment part. In addition, foreign matters, which are produced as the embossment part is damaged, can be prevented, so that the failure, such as the open or the short of the sensing electrode, can be improved. Accordingly, the productivity and the reliability of the touch window can be improved.

Therefore, the optical characteristic of the touch window can be improved. The brightness value can be increased due to the radius of curvature of the curved surface. Accordingly, the brightness or the transmittance of the touch window can be corrected.

The electrode layer according to the embodiment can be formed through a printing process. Accordingly, the process number, the process time, and the process cost can be reduced as compared with conventional deposition and photography processes. Since the sensing electrode is formed in the mesh shape, the printing quality can be improved, so that the high-quality touch window can be ensured.

The wire electrode and the sensing electrode may be formed through the same process. Accordingly, the process number can be minimized, and the process efficiency can be improved.

Further, the ink flowing property of the wire material filled in the intaglio part can be increased, and the filling rate and the filling property can be improved.

The alignment part can prevent tolerance resulting from the contraction of a substrate caused during the process according to the embodiment, so that the electrodes can be prevented from being offset. Accordingly, the whole reliability and the whole efficiency of the touch window can be improved.

It will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. When a part is connected to the other part, the parts are not only directly connected to each other, but also indirectly connected to each other while interposing another part therebetween.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
a substrate comprising an active region and an unactive region;
a resin layer provided on the active region and the unactive region of the substrate and comprising a plurality of intaglio parts and a plurality of embossment parts;
an electrode layer in an intaglio part from the plurality of intaglio parts; and
a pad part provided in the unactive region,
wherein an embossment part from the plurality of embossment parts includes a curved surface,
wherein the curved surface is provided at an edge of the embossment part,
wherein the curved surface is provided at an end portion of the embossment part,
wherein the embossment part is interposed between the intaglio parts,
wherein the electrode layer comprises a sensing electrode on the active region and a wire electrode on the unactive region,
wherein a printed circuit board is connected with the wire electrode through the pad part, wherein the wire electrode has one end connected with the sensing electrode and an opposite end connected with the printed circuit board, and has a variable width while extending between the one end and the opposite end, wherein the resin layer directly contacts the substrate, wherein the sensing electrode and the wire electrode include a same material, wherein the sensing electrode and the wire electrode have a mesh shape, the sensing electrode comprises a first mesh line and a first mesh opening part interposed between first mesh lines, and the wire electrode comprises a second mesh line and a second mesh opening part interposed between second mesh lines, wherein a width of the first mesh line corresponds to a width of the second mesh line in size, wherein the first mesh opening part and the second mesh opening part are the embossment part of the resin layer, and wherein the first mesh line and the second mesh line are the electrode layer in the intaglio part of the resin layer, and wherein the wire electrode is one of multiple wire electrodes included in the electrode layer and positioned on the unactive region, and the wire electrode has a width narrower than a distance between the wire electrodes.

2. The touch window of claim 1, wherein the curved surface has a radius of curvature equal to or less than a width of the embossment part.

3. The touch window of claim 2, the radius of curvature is ¹/₁₀ to one time as great as the width of the embossment part.

4. The touch window of claim 1, wherein the intaglio part comprises a first intaglio part on the active region and a second intaglio part on the unactive region, and wherein the first intaglio part has a depth different from a depth of the second intaglio part.

5. The touch window of claim 1, wherein the wire electrode have at least one of a linear line and a curved line.

6. The touch window of claim 1, wherein the wire electrode includes a plurality of sub-wire electrodes extending in mutually different directions, and an angle between the sub-wire electrodes is in a range of 10° to 170°.

7. The touch window of claim 1, wherein the electrode layer further includes a plurality of wire electrodes, the wire electrodes comprise inflected parts, and a number of the inflected parts is less than a number of the wire electrodes.

8. The touch window of claim 1, wherein the substrate comprises a first substrate and a second substrate on the first substrate, the first substrate is provided thereon with a cover substrate, the touch window further comprises:
a first alignment part on the cover substrate;
a second alignment part on the first substrate; and
a third alignment part on the second substrate,
the first alignment part, the second alignment part, and the third alignment part are overlapped with each other, and
one of the second alignment part, or the third alignment part is provided inside the other alignment part.

9. The touch window of claim 8, wherein at least one of the first alignment part, the second alignment part, or the third alignment part has at least one of a dot shape and a ring shape.

10. The touch window of claim 8, wherein at least two of the first alignment part, the second alignment part, or the third alignment part are mutually different from each other.

11. The touch window of claim 8, wherein the resin layer is provided on at least one of the first substrate and the second substrate.

12. The touch window of claim 1, further comprising a cover substrate on the substrate, wherein the electrode layer comprises the sensing electrode and the wire electrode, and the sensing electrode comprises a first sensing electrode on the cover substrate and a second sensing electrode on the substrate.

13. The touch window of claim 1, further comprising a cover substrate on the substrate, wherein the electrode layer comprises the sensing electrode and the wire electrode, and the sensing electrode comprises a first sensing electrode on one surface of the substrate and a second sensing electrode on a surface opposite to the one surface.

14. The touch window of claim 1, wherein the sensing electrode comprises a first sensing electrode and a second sensing electrode on a same surface of the substrate.

15. The touch window of claim 1, wherein the electrode layer includes a nanowire, photosensitive nanowire film, carbon nano tube (CNT), graphene, conductive polymer, or the mixture thereof.

16. The touch window of claim 1, wherein the electrode layer include at least one of chromium (Cr), nickel (Ni), copper (Cu), aluminum (Al), silver (Ag), molybdenum (Mo), gold (Au), titanium (Ti), or the alloy thereof.

17. The touch window of claim 1, wherein the width of the first mesh line is in the range of 0.1 μm to 10 μm.

18. The touch window of claim 1, wherein the embossment part has a width in the range of 1 μm to 3000 μm.

19. The touch window of claim 1, wherein the width of the first mesh line is in the range of 0.5 μm to 7 μm.

20. The touch window of claim 1, wherein a ratio of a line width of the wire electrode to the width of the first mesh line is in the range of 0.5:1 to 5:1.

* * * * *